Dec. 22, 1964 S. ZAKLAD 3,162,757

COMPUTER TO ANALYZE TARGET MOVEMENT

Filed July 20, 1960 12 Sheets-Sheet 1

INVENTOR
SAUL ZAKLAD
BY [signature]
ATTORNEY

INVENTOR
SAUL ZAKLAD
BY Henry Huff
ATTORNEY

COMPUTER TO ANALYZE TARGET MOVEMENT

Filed July 20, 1960 12 Sheets-Sheet 3

INVENTOR
SAUL ZAKLAD
BY
[signature]
ATTORNEY

INVENTOR
SAUL ZAKLAD
BY
Henry Hugg
ATTORNEY

INVENTOR
SAUL ZAKLAD
BY Henry Huff
ATTORNEY

INVENTOR
SAUL ZAKLAD
BY
ATTORNEY

COMPUTER TO ANALYZE TARGET MOVEMENT

Filed July 20, 1960 12 Sheets-Sheet 7

INVENTOR
SAUL ZAKLAD
BY
[signature]
ATTORNEY

Dec. 22, 1964 S. ZAKLAD 3,162,757

COMPUTER TO ANALYZE TARGET MOVEMENT

Filed July 20, 1960 12 Sheets-Sheet 9

INVENTOR
SAUL ZAKLAD
BY [signature]
ATTORNEY

Dec. 22, 1964 S. ZAKLAD 3,162,757

COMPUTER TO ANALYZE TARGET MOVEMENT

Filed July 20, 1960 12 Sheets-Sheet 10

INVENTOR
SAUL ZAKLAD
BY
Henry Hugg
ATTORNEY

INVENTOR
SAUL ZAKLAD
BY
ATTORNEY

Dec. 22, 1964 S. ZAKLAD 3,162,757

COMPUTER TO ANALYZE TARGET MOVEMENT

Filed July 20, 1960 12 Sheets-Sheet 12

INVENTOR
SAUL ZAKLAD
BY [signature]
ATTORNEY

United States Patent Office 3,162,757
Patented Dec. 22, 1964

3,162,757
COMPUTER TO ANALYZE TARGET MOVEMENT

Saul Zaklad, Westbury, N.Y., assignor to Sperry Rand Corporation, Great Neck, N.Y., a corporation of Delaware Filed July 20, 1960, Ser. No. 44,228
12 Claims. (Cl. 235—187)

Figure 1:
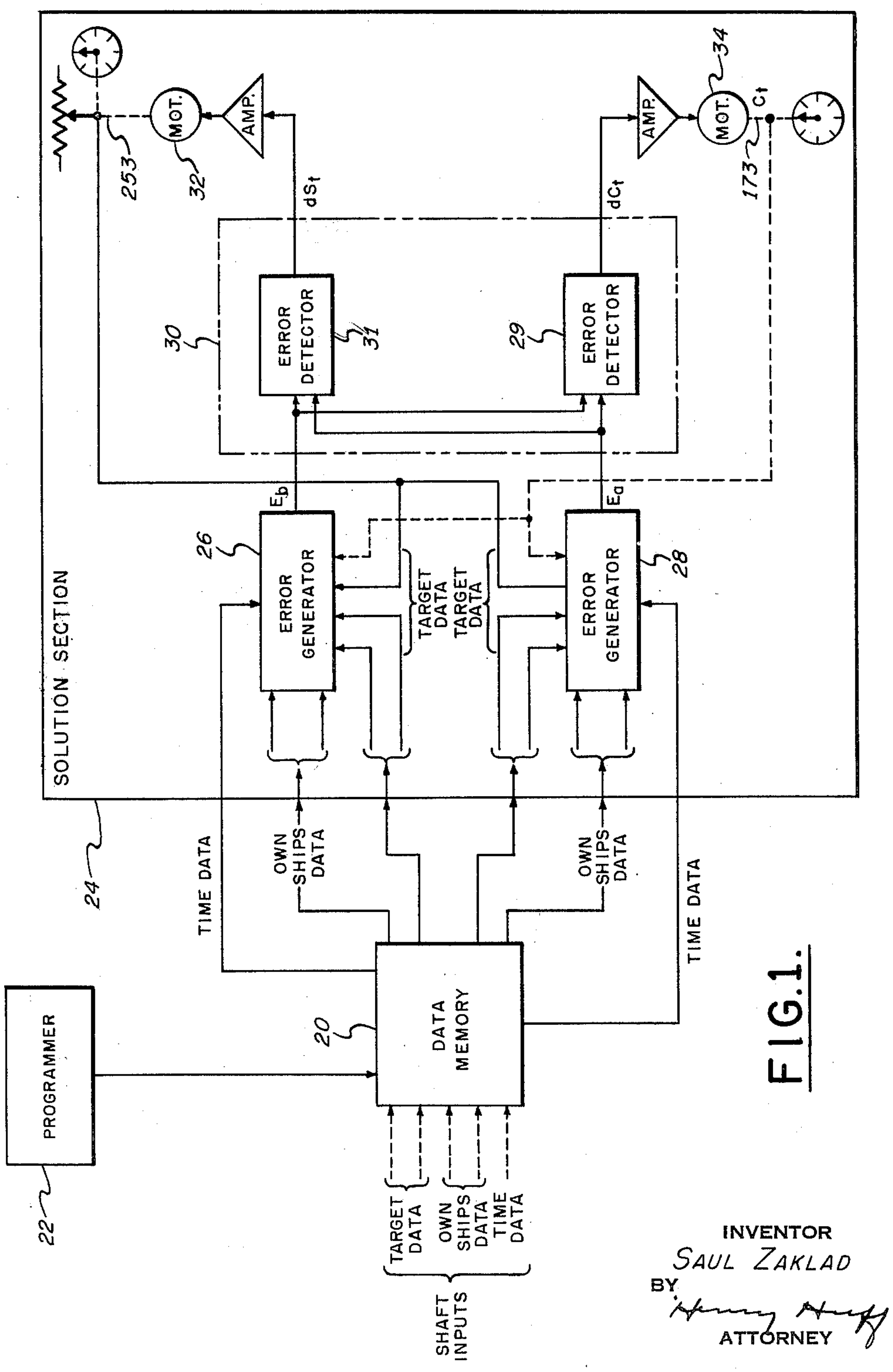

This invention relates to apparatus for solving simultaneous equations and more particularly to apparatus for computing the course and speed of a moving object, for example a target, from observations taken at an independent moving conveyance, such as a vessel. In a still more specific sense, the invention relates to a target analyzer.

A target analyzer is an apparatus which computes target course and speed from an analysis of own ship's movement data and target data. The target data includes time-spaced discrete observations of bearing and range parameters such as bearing, relative bearing, and range and range rate. The own ship's movement data may include course, speed between observation points, and travel along reference coordinate axes during time elapsed between observations. The latter times are part of the data furnished to the target analyzer. Target analyzer, in general together with means for supplying signals such as shaft positions, representing the input data, are old in the art.

Previously proposed target analyzers involved two types of solutions, one including three bearing observations and range taken at any one of the three observations, the other including two bearing observations with range taken at both observations. The former and the latter are respectively known as the "three-bearing" solution and the "end point" solution. Data concerning own ship's (observing ship's) movements between observations is also employed in these solutions. A target analyzer includes a memory section and a solution section. The value of an input variable at the time of an observation is stored or memorized by applying a brake to a shaft representing the variable at the time of the observation. The memory section is programmed by a control circuit for operating the various brakes in the proper sequence so that the solution section which receives the outputs of the shaft memories can perform the computation of target course and speed. In prior proposed systems each shaft was associated with a definite chronological order, so that when a particular observation was dropped, the memory of the latest remaining observation had to be transferred, for example, by a servo from its shaft to the shaft which was chronologically associated with the new order of the transferred memory. After a delay the transferer shaft would be unbraked, and prepared to receive a new observation of the proper chronological order associated with that shaft. For example, if in the three bearing type solution, the second observation was dropped, the information on the third observation shaft would be transmitted to the second observation shaft. After a delay, the third shaft would be unbraked, and its function changed from transmitter to receiver preparatory to receipt of a new third observation. Only the second or third observation could be dropped in such systems. Likewise, in the end-point case, only the last observation could be dropped.

The present invention contemplates a target analyzer wherein any observation may be dropped regardless of its chronological order. In this system, the shaft memories have no particular chronological persuasion, and there is no transfer of information from one to another when dropping observations. Thus, the extra servo and other transfer circuits of the previously proposed systems are not required in the systems embodying the present invention. In addition to the three-bearing and end-point modes, the target analyzer of the present invention also provides a solution mode referred to as range-rate mode and based on a bearing-only observation and an observation including bearing, relative bearing, range, and a range rate, plus own ship's movement information related to both observations.

An important aspect of the invention is the solution section which includes a novel simultaneous equation solver that has independent utility apart from target analysis. In the solution section, pairs of simultaneous equations including own ship's and target data as independent variables (known quantities) and target course and speed as dependent variables (unknowns) are mechanized, and are solved by a servo system including the mechanizations of the equations as error generators whose respective outputs are included as inputs of an error distributor which provides two outputs that are respectively functions of the error due to target course and target speed, the two outputs respectively energizing two servo mechanisms whose outputs are employed to provide target course and target speed input values to the error generators. When the latter input values are correct, the outputs of the error generators reduce to zero and the servos are nulled, the outputs of the servos then representing the correct target course and speed, respectively. One aspect of the invention involves the discovery of and mechanization under general equations, of sets of simultaneous equations for the respective types of solution for target course and speed, and which have a common symmetry allowing common mechanizations to accommodate a number of equations.

It is therefore an object of the present invention to provide a novel apparatus for determining course and speed of a moving target from a plurality of discrete observations taken at different times;

Another object is such apparatus wherein any observation may be dropped and a new one substituted;

Another object is such apparatus wherein memory shafts for storing observation data have no chronological identity with respect to insertion order and there is no transfer of information from one to another of the memory shafts when an observation is dropped.

Another object of the invention is such apparatus capable of rapid accurate solution of target course and speed;

A further object is a novel simultaneous equation solver for use in apparatus of the character described or for independent use;

A further object is a novel programming system for programming the brakes of the memory shafts in apparatus of the character described.

Other objects and advantages of the present invention will be apparent from the following description, reference being had to the accompanying drawings wherein a preferred form of the present invention is clearly shown.

Figures 2A, 2B:
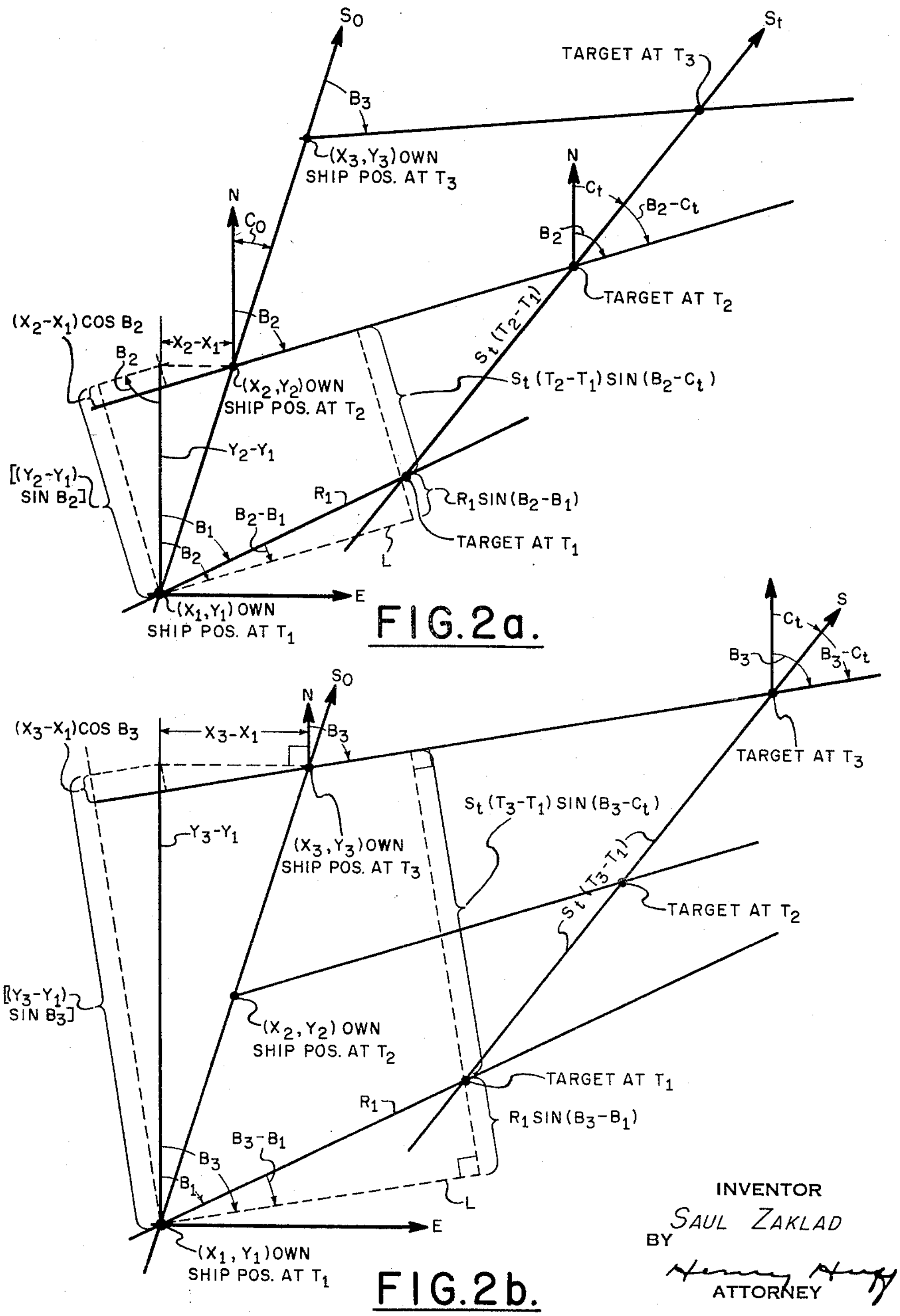
Figure 11:
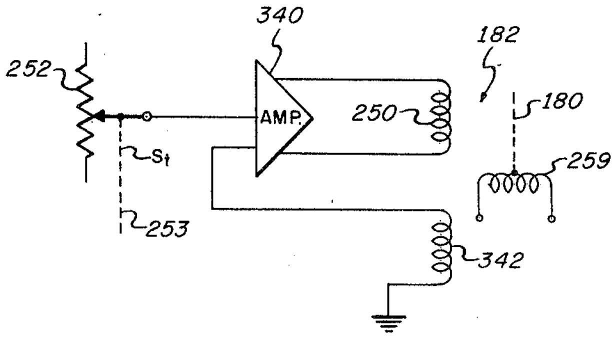
Figure 8:
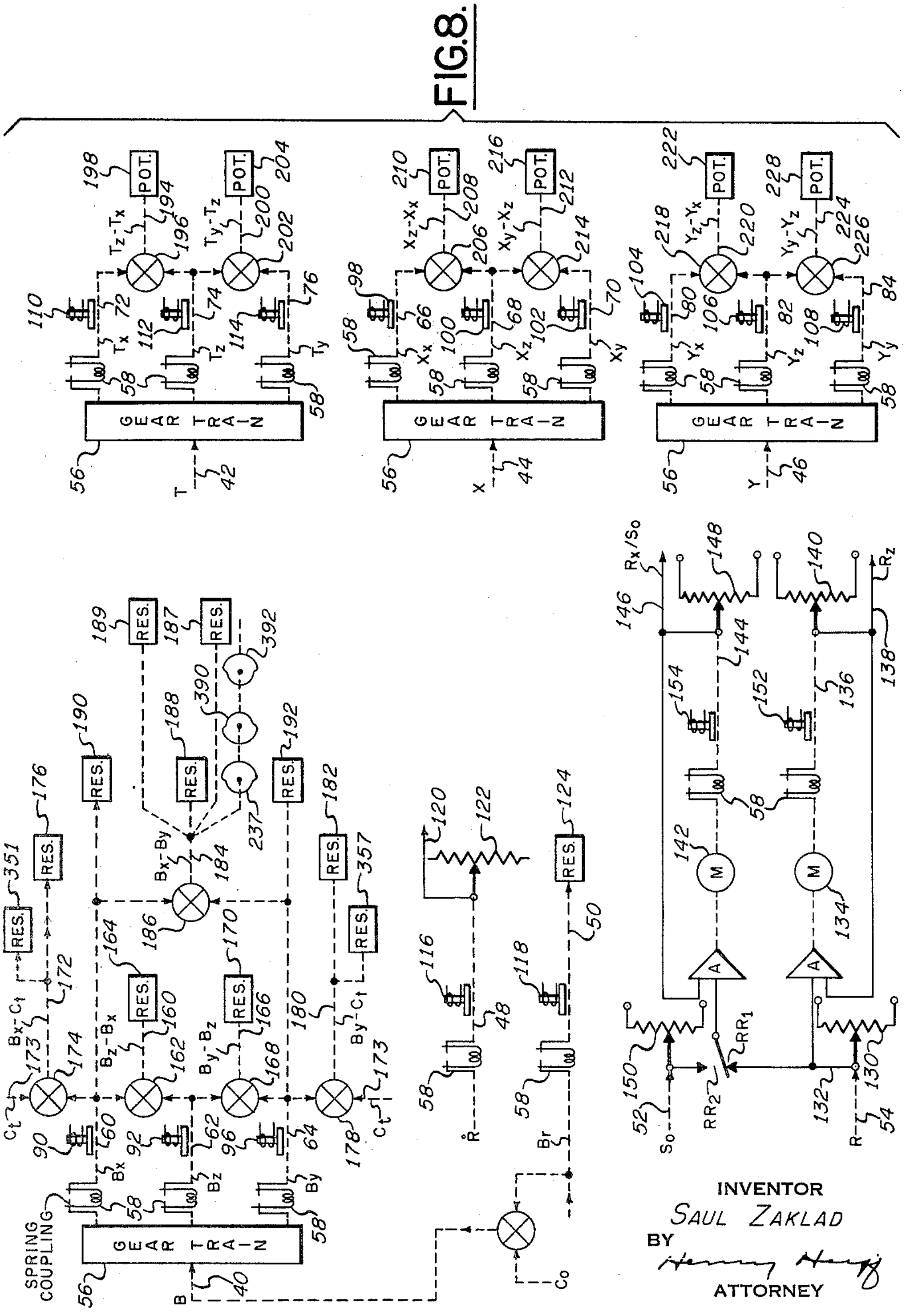
Figure 9A:
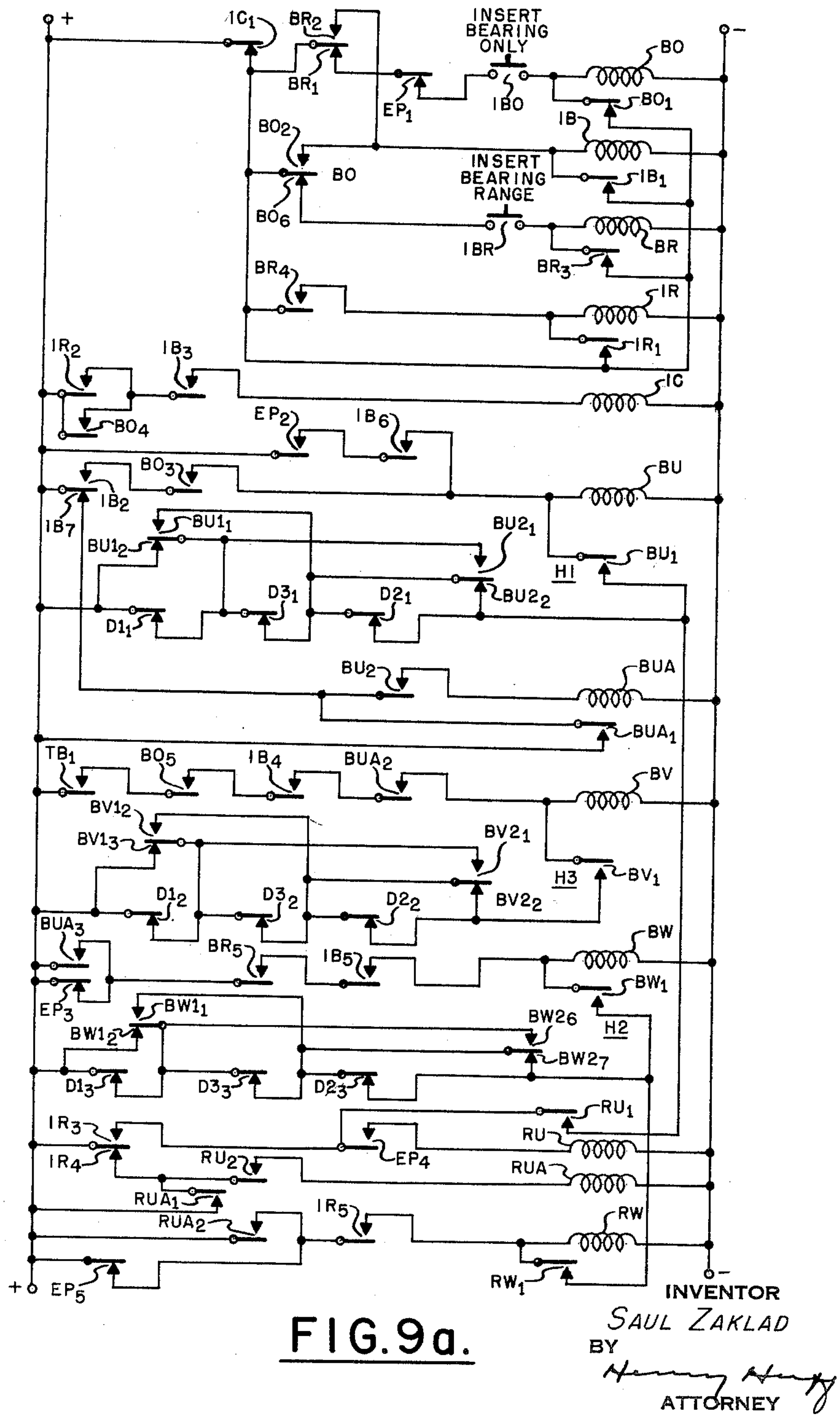
Figure 9B:
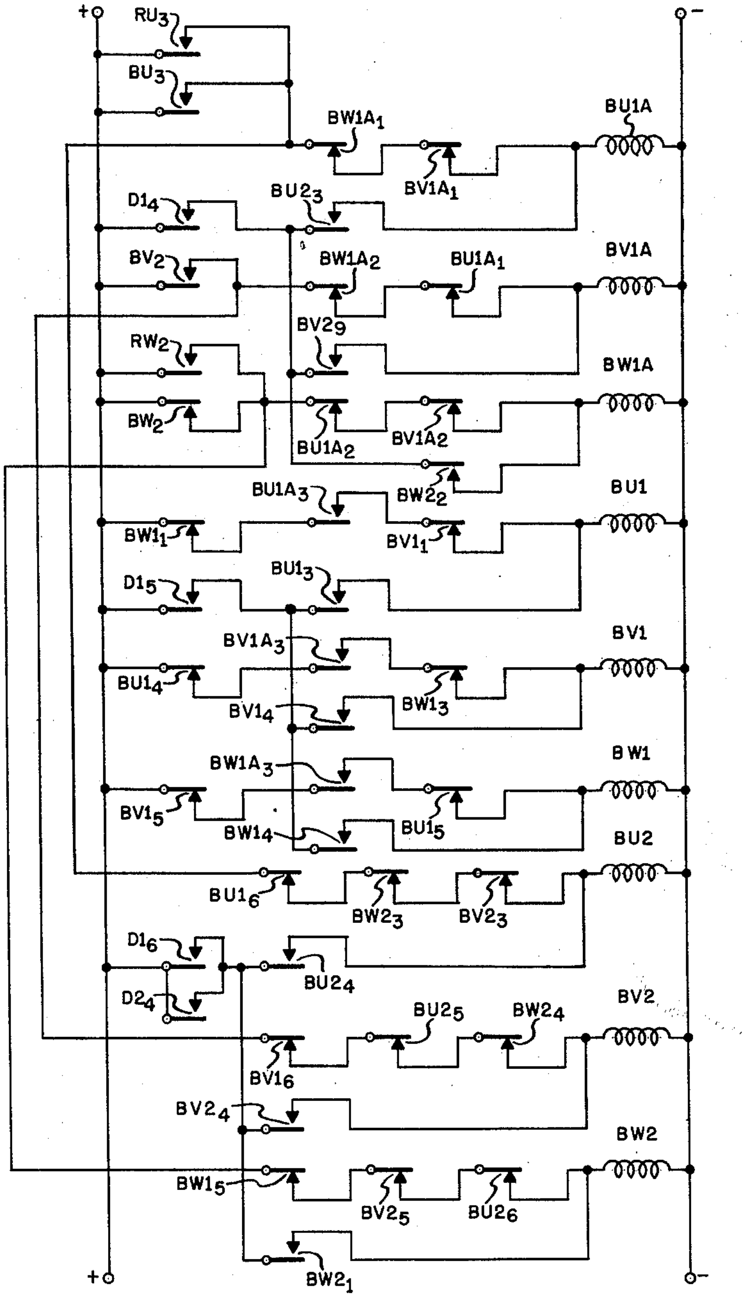
Figure 10A:
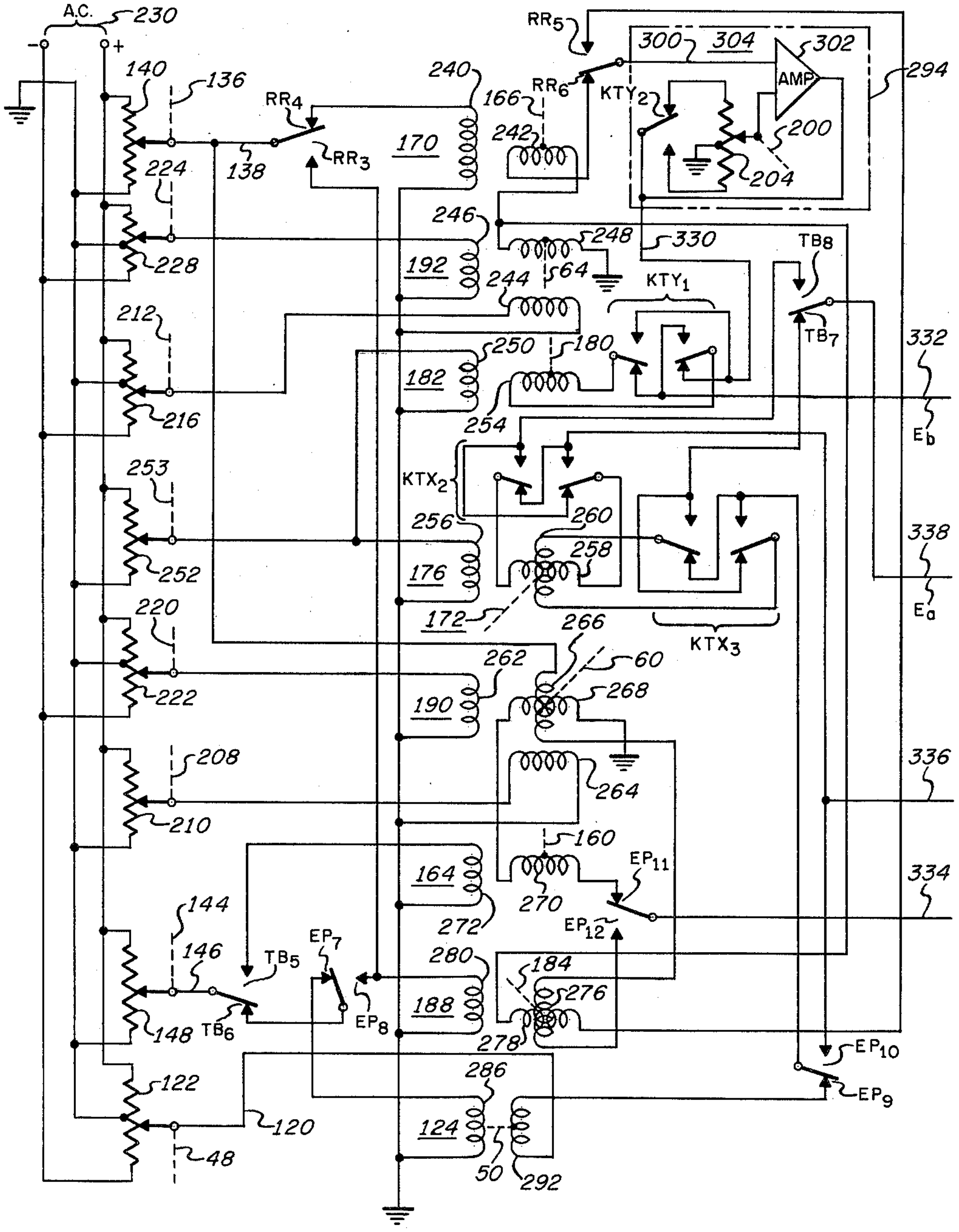
Figure 10B:
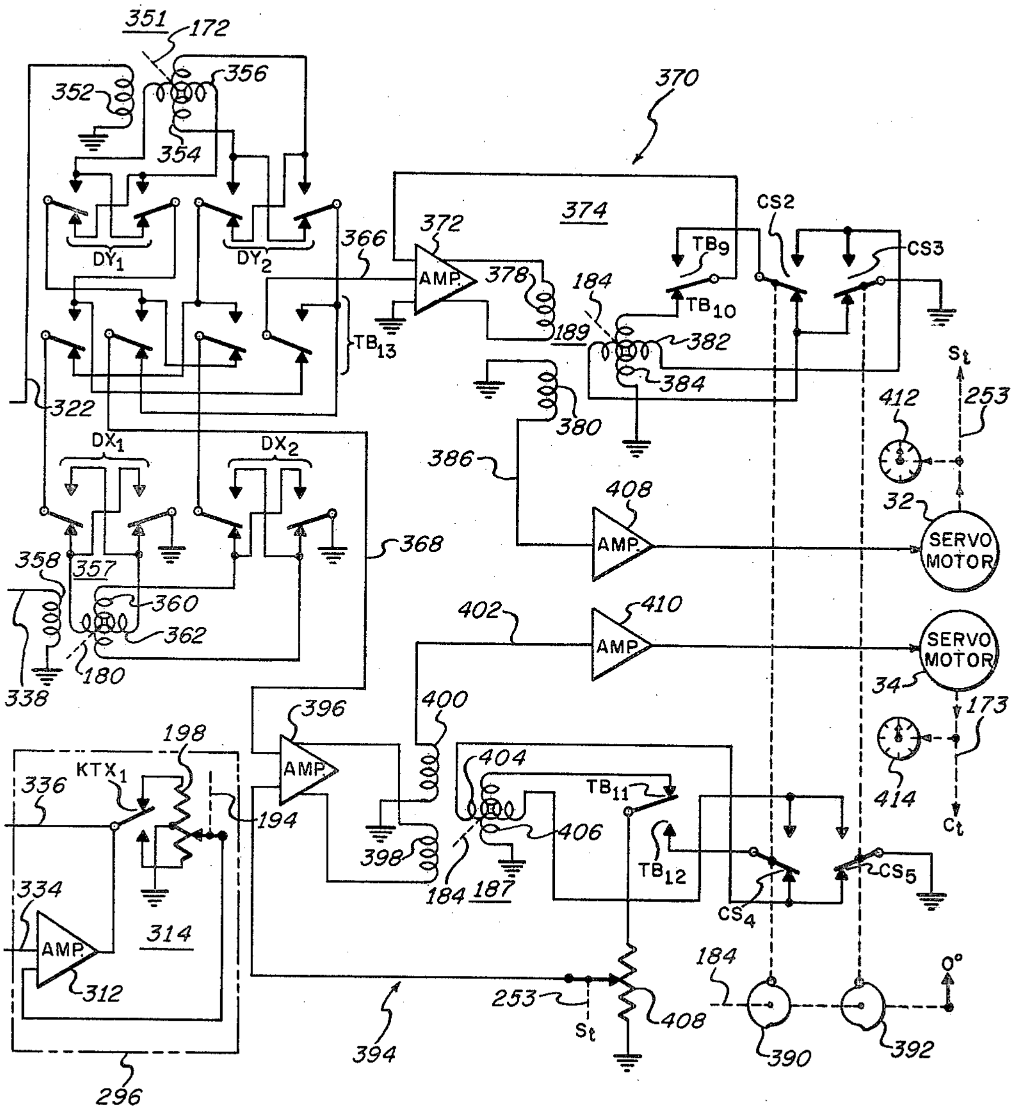

In the drawings:

FIG. 1 is a block diagram of a target analyzer embodying the invention;

FIGS. 2(*a*) and (*b*), 3(*a*) and (*b*), 4(*a*) and (*b*), 5, 6 and 7 are geometric diagrams illustrating the geometry employed and the derivation of the sets of simultaneous equations employed in the mechanization of the solution section of the invention;

FIG. 8 is a set of block diagrams of memory shafts and associated apparatus in the data memory section;

FIGS. 9(*a*), (*b*) and (*c*), taken together, by connecting the + and — lines, form a schematic diagram of the programmer;

FIGS. 10(*a*) and (*b*) placed side-by-side with common points connected together form a schematic diagram of the solution or computer loop;

FIG. 11 is a diagram illustrating amplifier and feedback circuits which may be employed in the input circuits of the resolvers in FIGS. 10(*a*) and (*b*).

The target analyzer of FIG. 1 includes a data memory 20 in which own ship's movement data, target data, and time data, are stored on braked shafts and in potentiometers attached to shafts in accordance with orders from a programmer 22 which selectively assigns and drops, as required, observed data to and from the data memory elements in proper order. The programmer 22 accepts orders from an operator, and on the basis of its own memory of the distribution of the data in the data memory 20, enters new data into the proper memory elements each time an observation is taken.

Various own ship's movement data such as course, travel along reference coordinate axes such as North-South and East-West, time between observations, and speed of ship at the time of the range observation, are supplied to the data memory 20 as shaft positions either cranked in manually or from well-known sensory and computing devices on the ship. For example, own ship's course may be obtained from a gyro compass, travel X and Y (east and north) from a dead reckoning analyzer indicator, and time from a synchronous motor powered from a reference frequency source. Likewise, target data, including bearing data, such as true bearing and relative bearing, and range data, such as range rate and range, are supplied to the data memory 20 as shaft positions by manual crank or from well-known sensory and computing devices on the ship. For example, relative bearing may be obtained from sonar or radar apparatus, range from sonar, radar, or stadimeter, range-rate from a graphic recorder indicator or from sonar apparatus, and true-bearing from a differential driven by the relative bearing shaft and the own ship's course shaft.

It is common knowledge to supply the various own ship and target data from the shipboard sensing and computing devices through synchro systems to position shafts according to such data.

Stored observation data is supplied by the data memory 20 to a solution section 24 which solves for target course and target speed on the basis of two simultaneous equations each including target course and speed as independent variables and own ship and target data as dependent variables. In the solution section 24, is a pair of error generators 26 and 28, each the mechanization of one of the simultaneous equations. Each error generator produces an output signal that is a function of the total error due to both target course and speed in the mechanized equation of the detector. The outputs of the error generators are supplied to an error distributor 30, in which error detectors 29 and 31 determine the error increments due respectively to target course and target speed, and provide outputs representing these error increments to drive respective servomotors 32 and 34, whose outputs are employed to provide input values of target course and speed to the error generators 26 and 28. When the correct values of target speed and course are applied to the error generators by the servomotors 32 and 34, the outputs of the respective error generators reduce to zero and the motors null at positions representing target speed and target course respectively. One of the equations in each of the two pairs of simultaneous equations associated respectively with the three-bearing and end-point (and range rate) cases, is similar for the two cases. This similarity extends to such an extent to one of the range-rate equations that only a slight change is required in its mechanization. The other equations of the respective pairs are dissimilar. Consequently, while the mechanization of one of the error generators 26 is quite similar for all cases, the other error generator 28 is mechanized differently by selection means for each case. The mechanization of the error distributor is also governed by the type of solution, although there are sufficient similarities to allow selective sharing of components for mechanizations necessary in connection with the different types of solutions. The geometries involved and the derivation of equations for each solution mode will be described before going into details of any mechanization or circuitry.

The development of sets of simultaneous equations which are mechanized in the error detectors of the solution section of the target analyzer in accordance with the present invention for the solution of target course $C_t$ and target speed $S_t$ is illustrated in FIGS. 2 to 7. The quantities and associated symbols employed in the solutions are as follows:

X and Y axes—mutually perpendicular direction reference coordinate axes, for example North-South and East-West;

$T_1$, $T_2$, $T_3$—first, second and third observation times respectively;

$X_1$, $Y_1$, $X_2$, $Y_2$, $X_3$, $Y_3$, own ship's position at observation times $T_1$, $T_2$, $T_3$, respectively;

$S_o$—own ship's speed;

$S_t$—target speed;

$C_o$—own ship's course;

$C_t$—target course;

B—true target bearing;

$B_1$, $B_2$, $B_3$—true target bearings at first, second and third observations respectively;

$B_r$—relative target bearing, being the angle between forward and aft axis of own ship and line of sight to the target measured clockwise from bow of own ship;

$X_2-X_1$— own ship's travel along X axis during time $T_2-T_1$;

$X_3-X_2$—own ship's travel along X axis during time $T_3-T_2$;

$X_3-X_1$—own ship's travel along X axis during time $T_3-T_1$;

$Y_2-Y_1$—own ship's travel along Y axis during time $T_2-T_1$;

$Y_3-Y_2$—own ship's travel along Y axis during time $T_3-T_2$;

$Y_3-Y_1$—own ship's travel along Y axis during time $T_3-T_1$;

R—target range, being the line-of-sight distance from own ship to target;

$R_1$, $R_2$, $R_3$—target ranges taken on first, second and third observations, respectively;

$\dot{R}$—rate of change of target range.

GEOMETRY AND EQUATIONS FOR 3-BEARING CASE

Figures 3A, 3B:
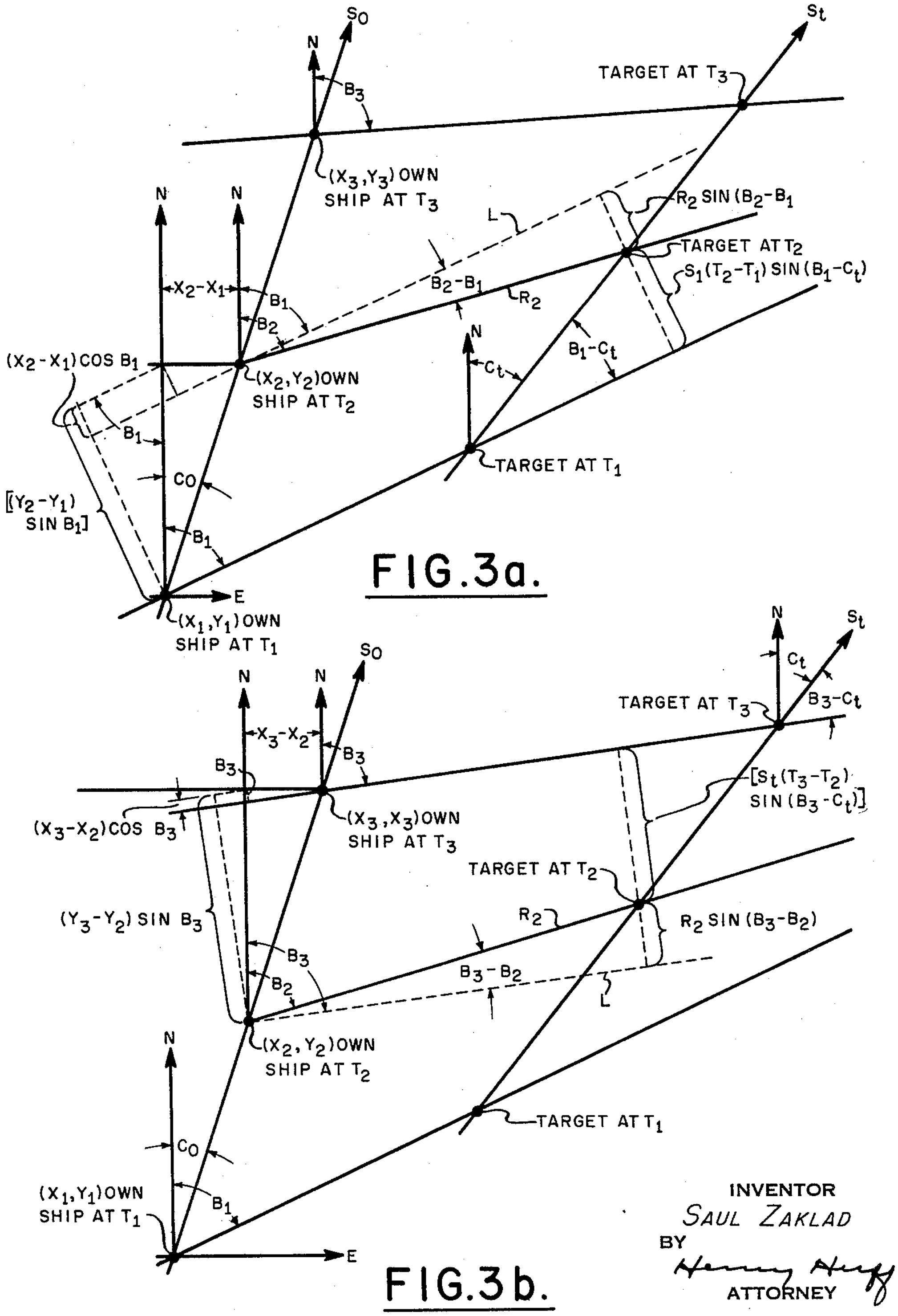
Figure 4A:
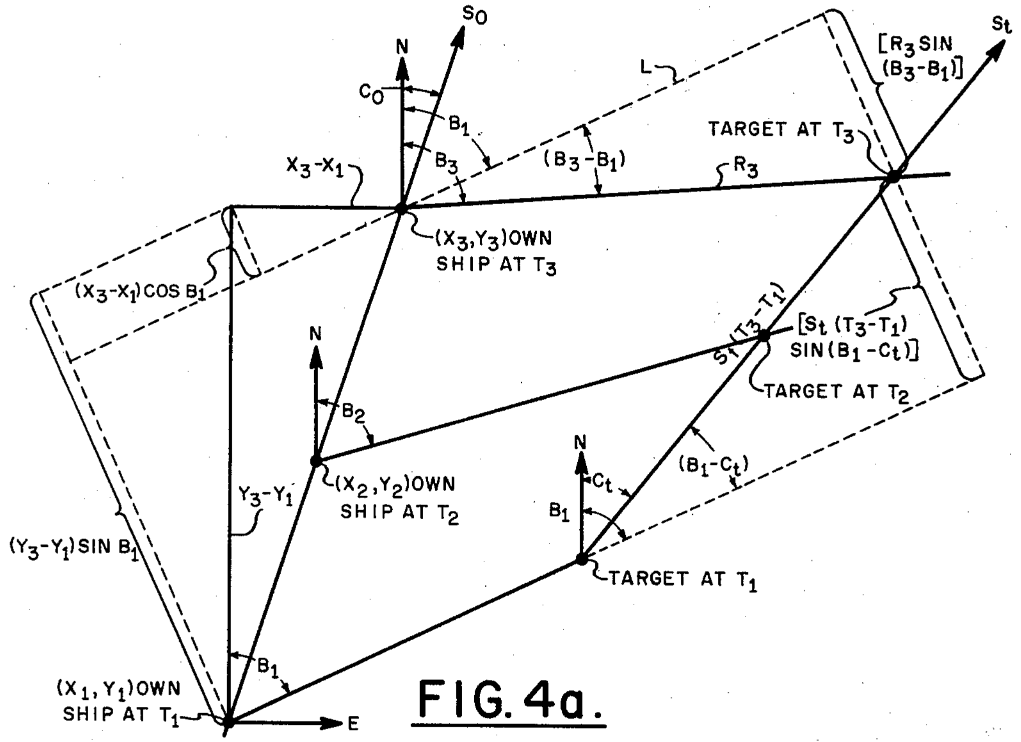
Figure 4B:
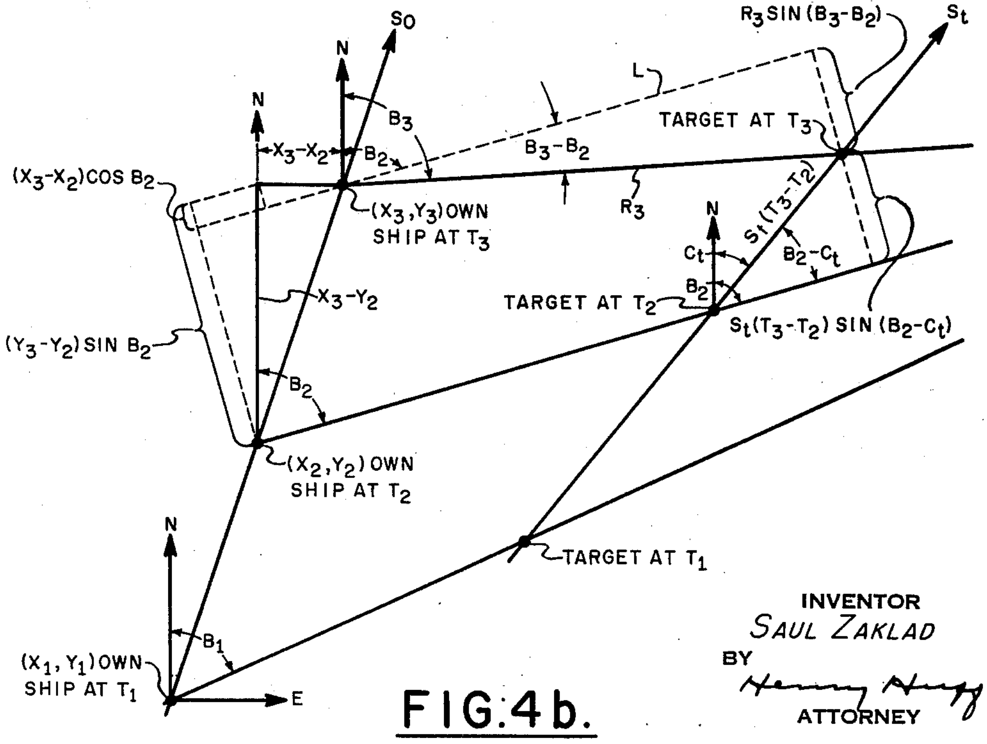

There are three forms of three-bearing solution, depending on which observation the range is taken. In addition to target bearing and range, data respecting own ship position east and north at times $T_1$, $T_2$ and $T_3$, $(X_1, Y_1)$, $(X_2, Y_2)$, and $(X_3, Y_3)$, is also employed in the three-bearing solution. FIGS. 2, 3 and 4 illustrate the development of the respective pairs of simultaneous equations used in the three forms of three-bearing solutions.

FIG. 2 shows the geometry and derivation of the pair of equations related to the three-bearing case wherein the range is taken on the first observation. The first equation is developed in FIG. 2(*a*) by drawing a construction line L through own ship's position at time $T_1$ parallel to the $B_2$ bearing line, and completing a rectangle including the line L and the $B_2$ bearing line, by drawing perpendiculars to these lines through the intersection of the range line and the target course $C_t$, and through own ship's position at time $T_1$. Bearing lines may also be referred to as observation lines of sight. The sides of the rectangle perpendicular to the $B_2$ bearing line are equated to each other using resolved quantities of own ship's and target data resolved across the $B_2$ bearing line (the $B_2$ bearing line is a bearing only line, i.e. no range on this line) to produce the equation.

$$R_1 \sin(B_2-B_1)+S_t(T_2-T_1)\sin(B_2-C_t) =(Y_2-Y_1)\sin B_2-(X_2-X_1)\cos B_2 \quad (1)$$

which, rearranged and divided by $(T_2-T_1)$ gives $$S_t \sin(B_2-C_t)+\frac{R_1 \sin(B_2-B_1)+(X_2-X_1)\cos B_2-(Y_2-Y_1)\sin B_2}{(T_2-T_1)}=( \quad (20$$

The development of the second equation for the three-bearing case with range on first observation is illustrated in FIG. 2(*b*) wherein a construction line L is drawn through own ship's position at time $T_1$ parallel to the $B_3$ bearing line.

A rectangle including the $B_3$ bearing line and line L is completed by perpendiculars drawn through own ship's position at time $T_1$ and through the intersection of the range line with the target course $C_t$. Equating those sides of the rectangle perpendicular to the $B_3$ bearing line in terms of own ship's and target data resolved across the $B_3$ bearing line (a bearing only line) provides the equation $$S_t(T_3-T_1)\sin(B_3-C_t)+R_1\sin(B_3-B_1) =(Y_3-Y_1)\sin B_3-(X_2-X_1)\cos B_3 \quad (3)$$

which may be rearranged as $$S_t \sin(B_3-C_t)+\frac{R_1 \sin(B_3-B_1)+(X_3-X_1)\cos B_3-(Y_3-Y_1)\sin B_3}{T_3-T_1}=0 \quad (4)$$

Each of Equations 2 and 4 is equal to zero when $C_t$ and $S_t$ are precisely known. When $C_t$ and $S_t$ are in error, the left side of each equaition will not be equal to zero, but each will be equal to a quantity which is the total error due to both $C_t$ and $S_t$. When both $C_t$ and $S_t$ are accurately known, the error is zero and thus the left side of these equations will be equal to zero. Geometry and techniques analogous to those employed in the evolution of Equations 2 and 4 are used in the derivation of the formulas for the other two three-bearing cases in which the range is taken on the second and third observation respectively.

The two simultaneous equations for the three-bearing case with range on second observation are derived from the geometry shown in FIG. 3.

In FIG. 3(*a*), the construction line L is parallel to the $B_1$ bearing line and passes through own ship's position at time $T_2$. The two perpendiculars to the $B_1$ lines for completing the rectangle pass through the target position at time $T_2$, and through own ship's position at time $T_1$, respectively.

FIG. 3(*a*) produces the equation $$S_t(T_2-T_1)\sin(B_1-C_t)+R_2\sin(B_2-B_1) =(Y_2-Y_1)\sin B_1-(X_2-X_1)\cos B_1 \quad (5)$$

which rearranged provides:

$$S_t \sin(B_1-C_t)+\frac{R_2 \sin(B_2-B_1)+(X_2-X_1)\cos B_1-(Y_2-Y_1)\sin B_1}{T_2-T_1}=0 \quad (6)$$

In FIG. 3(*b*) the construction line L is parallel to the $B_3$ bearing line and passes through own ship's position at time $T_2$. The rectangle is completed by perpendiculars to the $B_3$ line that pass through own ship's position at time $T_2$ and through the target position at time $T_2$, respectively.

FIG. 3(*b*) produces the equation:

$$S_t(T_3-T_2)\sin(B_3-C_t)+R_2\sin(B_3-B_2) =(Y_3-Y_2)\sin B_3-(X_3-X_2)\cos B_3 \quad (7)$$

and rearrangement provides:

$$S_t \sin(B_3-C_t)+\frac{R_2 \sin(B_3-B_2)+(X_3-X_2)\cos B_3-(Y_3-Y_2)\sin B_3}{T_3-T_2}=0 \quad (8)$$

Each of the Equations 6 and 8 is equal to zero when $S_t$ and $C_t$ are known. When $S_t$ and $C_t$ are unknown (incorrect), each of these equations is equal to some error value due to total error of both $S_t$ and $C_t$.

In the same manner the geometries illustrated in FIGS. 4(*a*) and (*b*) are used to derive the following pair of simultaneous equations for solving the three-bearing case where range is observed on the third bearing observation.

$$S_t \sin(B_1-C_t)+\frac{R_3 \sin(B_3-B_1)+(X_3-X_1)\cos B_1-(Y_3-Y_1)\sin B_1}{T_3-T_1}=0 \quad (9)$$

$$S_t \sin(B_1-C_t)+\frac{R_3 \sin(B_3-B_2)+(X_3-X_2)\cos B_2-(Y_3-Y_2)\sin B_2}{T_3-T_2}=0 \quad (10)$$

The construction line L in FIG. 4(*a*) is parallel to the $B_1$ bearing line and passes through own ship's position at time $T_3$, while the perpendiculars to the $B_1$ lines pass through target position at time $T_3$ and own ship's position at time $T_1$. In FIG. 4(*b*) the construction line L is parallel to the $B_2$ bearing line and passes through own ship's position at time $T_3$, and the perpendiculars to the $B_2$ lines for completing the rectangle pass through target position at time $T_3$ and own ship's position time $T_2$.

Equations 9 and 10 likewise are each equal to zero only when $S_t$ and $C_t$ are known. The equations are equal to an error value due to both $C_t$ and $S_t$ when the latter are unknown, which error values reduce to zero when $S_t$ and $C_t$ are known.

In all the above equations, whatever the subscript of a range may be (corresponding to observation order or chronology), any difference for variables such as X, Y, T and B, is referenced to the same subscript. For example, in Equation 2, where range is on the first observation ($R_1$), the differences are $X_2-X_1$, $Y_2-Y_1$, $B_2-B_1$, $T_2-T_1$. Likewise, in Equations 6 and 8, where range is $R_2$ that is on second observation, the subscripts are 2–1, and 3–2, while in Equations 9 and 10, where range is $R_3$ (taken on third observation), the subscripts are 3–1, and 3–2. It is evident that all the equations are symmetrical with respect to that observation which includes the range. Except for subscripts, Equations 4, 8 and 10 are similar and can be written in the general form:

$$S_t \sin(B_x-C_t)+\frac{R_x \sin(B_z-B_x)+(X_z-X_x)\cos B_x-(Y_z-Y_x)\sin B_x}{T_z-T_x}=0 \quad (17)$$

Likewise, Equations 2, 6 and 9 are similar and can be written in the general form:

$$S_t \sin(B_y-C_t)+\frac{R_z \sin(B_y-B_z)+(X_y-X_z)\cos B_y-(Y_y-Y_z)\sin B_y}{T_y-T_z}=0 \quad (18)$$

The small letter subscripts *x*, *y* should not be confused with capitals X, Y, which refer to ship's position along coordinate axes X and Y. It should be remembered that for the three-bearing case, range is taken on one observation. Thus, in Equations 17 and 18, $R_x$ and $R_z$ are equal for the three-bearing case. For the three-bearing case, error generator 26 is a mechanization of Equation 18, while error generator 28 is a mechanization of Equation 17. The error generators 26 and 28 are dynamic devices and the outputs of the generators are zero only when $S_t$ and $C_t$ are correct, the equations for the generators 26 and 28 may be written $$E_b=S_t \sin (B_y-C_t)+\frac{R_z \sin (B_y-B_z)+(X_y-X_z)\cos B_y-(Y_y-Y_z)\sin B_y}{T_y-T_z}=0 \quad (19)$$

for generator 26, and $$E_a=S_t \sin (B_x-C_t)+\frac{R_x \sin (B_z-B_x)+(X_z-X_x)\cos B_x-(Y_z-Y_x)\sin B_x}{T_z-T_x}=0 \quad (20)$$

for generator 28.

The generator 26 is $E_b$, a function of total error due to $S_t$ and $C_t$. Likewise, the output of generator 28 is $E_a$, a function of the total error due to $S_t$ and $C_t$. When the correct values of $S_t$ and $C_t$ are supplied to the error generators, their outputs $E_a$ and $E_b$ reduce to zero.

Equations to be mechanized in the error distributor for determining the instantaneous error $dSt$ and $dCt$ due to $S_t$ and $C_t$ respectively in Equations 19 and 20 are derived as follows: The total incremental error due to both $S_t$ and $C_t$ in Equations 19 and 20 may be expressed in the general equations:

$$dE_a=\frac{\partial E_a}{\partial S_t}dS_t+\frac{\partial E_a}{\partial C_t}dC_t \quad (21)$$

and $$dE_b=\frac{\partial E_b}{\partial S_s}dS_t+\frac{\partial E_b}{\partial C_t}dC_t \quad (22)$$

where $dE_a$ is total incremental error in equation 19, i.e. $dE_a$ is instantaneous value of $E_a$, $dE_b$ is total incremental error in Equation 20, $dS_t$ is incremental error due to $S_t$, $dC_t$ is incremental error due to $C_t$, and $\partial$ is the partial derivative sign; from the simultaneous solution of Equations 21 and 22, the general equations for $dS_t$ and $dC_t$ are then:

$$dS_t=\frac{\frac{\partial E_b}{\partial C_t}dE_a-\frac{\partial E_a}{\partial C_t}dE_b}{\frac{\partial E_a}{\partial S_t}\frac{\partial E_b}{\partial C_t}-\frac{\partial E_a}{\partial C_t}\frac{\partial E_b}{\partial S_t}} \quad (23)$$

$$dC_t=\frac{\frac{\partial E_a}{\partial S_t}dE_b-\frac{\partial E_b}{\partial S_t}dE_a}{\frac{\partial E_a}{\partial S_t}\frac{\partial E_b}{\partial C_t}-\frac{\partial E_a}{\partial C_t}\frac{\partial E_b}{\partial S_t}} \quad (24)$$

Related to Equations 19 and 20 are the following partial derivations:

$$\frac{\partial E_a}{\partial S_t}=\sin (B_x-C_t)$$

$$\frac{\partial E_a}{\partial C_t}=-S_t \cos (B_x-C_t)$$

$$\frac{\partial E_b}{\partial S_t}=\sin B_y-C_t)$$

$$\frac{\partial E_b}{\partial C_t}=-S_t \cos (B_y-C_t)$$

Substituting these values in Equations 23 and 24 and reducing, the following specific equations for $dS_t$ and $dC_t$ are obtained.

$$dS_t=\frac{dE_a \cos (B_y-C_t)-dE_f \cos (B_x-C_t)}{\sin (B_x-B_y)} \quad (25)$$

$$dC_t=\frac{dE_a \sin (B_y-C_t)-dE_b \sin (B_x-C_t)}{S_t \sin (B_x-B_y)} \quad (26)$$

For the three-bearing solution, Equations 25 and 26 are mechanized as error detectors 31 and 29 in the error distributor 30 to provide output voltages representing $dS_t$ and $dC_t$.

GEOMETRY AND EQUATIONS FOR THE END-POINT CASE

The end-point solution is based on two observations, range and bearing being taken on both observations. Additional known quantities employed in the solution are own ship position east and north at times $T_1$ and $T_2$, $(X_1, Y_1)$ and $(X_2, Y_2)$. One of the pair of simultaneous equations on which the end-point case is based is the same as Equation 6 and is derived in the same manner. Thus, one end-point equation comes under the general Equation 18, and this equation is used to mechanize error generator 26 to provide $E_b$ for the end-point case.

Figures 5, 7:
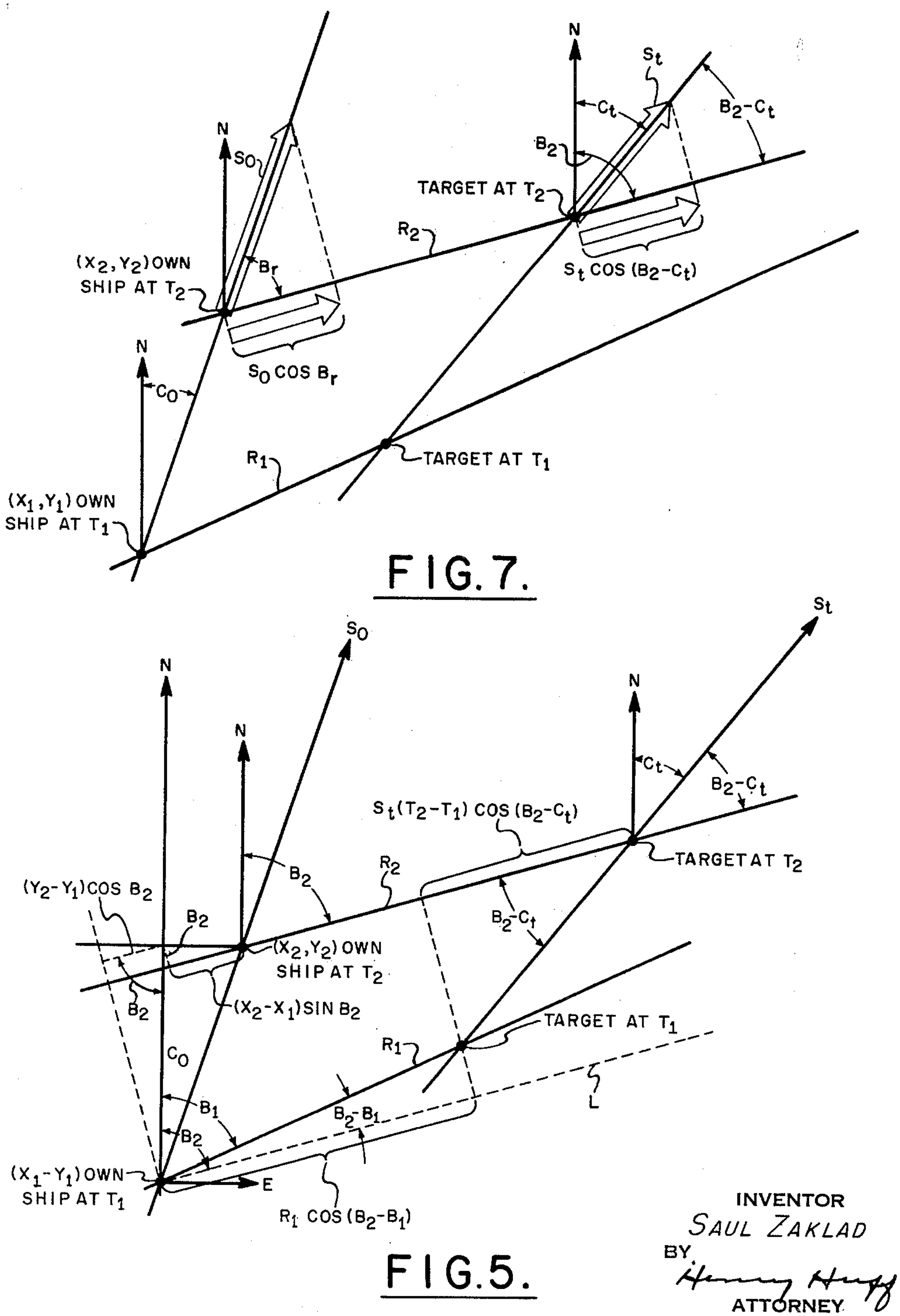

The second of the pair of simultaneous equations for the end-point case is:

$$\frac{(X_z-X_x)\sin B_x+(Y_z-Y_x)\cos B_x+R_z-R_x\cos(B_x-B_y)}{T_z-T_x}-S_t \cos (B_x-C_t)=0 \quad (27)$$

and it is derived from the geometry shown in FIG. 5 which gives the specific equation:

$$R_1 \cos (B_2-B_1)=(Y_2-Y_1) \cos B_2+(X_2-X_1) \sin B_2+R_2-S_t(T_2-T_1) \cos (B_2-C_t) \quad (28)$$

from which Equation 27 is derived. For the end-point case, in Equations 18 and 27, $B_x=B_z$, $X_x=X_y$, $T_x=T_y$, and $Y_x=Y_y$. This permits a common sharing of components and simplification of the mechanization. In FIG. 5, the construction line L is drawn through own ship's position at time $T_1$ and parallel to the $B_2$ bearing line, while the perpendiculars to the $B_2$ lines to complete the rectangle are drawn through own ship's and target's position at time $T_1$. In contrast to the previous derivations, the sides of the rectangle parallel to a bearing line are equated with each other, and target and own ship's data are resolved along a bearing line. In the previously described derivations, the sides of the rectangle perpendicular to a bearing line were equated with each other and resolution was made along these lines.

For the end-point case, Equation 18 is mechanized in error generator 26 to provide the output $E_b$, while Equation 27 is mechanized in error generator 28 to provide the output $E_a$. Thus, the equation for error generator 26 is Equation 19 while the equation for error generator 28 is:

$$E_a=\frac{(X_z-X_x)\sin B_x+(Y_z-Y_x)\cos B_x+R_z-R_x\cos(B_x-B_y)}{T_z-T_x} \quad S_t \cos (B_x-C_t) \quad (29)$$

Equations 21, 22, 23 and 24 are general, and they are employed to obtain the following Equations 30 and 31 for $dS_t$ and $dC_t$, the incremental errors due respectively to $S_t$ and $C_t$ in error detectors 26 and 28 as mechanized in accordance with Equations 18 and 27.

$$dS_t=\frac{-E_a \cos (B_y-C_t)+E_b \sin (B_x-C_t)}{\cos (B_x-B_y)} \quad (30)$$

$$dC_t=\frac{-E_a \sin (B_y-C_t)-E_b \cos (B_x-C_t)}{S_t \cos (B_x-B_y)} \quad (31)$$

Equations 30 and 31 are mechanized as the error detectors 31 and 29 in the error distributor 30 to provide output voltages representing $dS_t$ and $dC_t$ respectively to the $S_t$ and $C_t$ servomotors.

GEOMETRY AND EQUATIONS FOR THE RANGE-RATE CASE

The range rate case involves two observations, target bearing being taken on either first or second observations, and, target bearing, range, and range rate, being taken on the other observation. Additional information required: own ship's speed, relative target bearing at first observation, own ship's travel along X and Y axes between observations, and the elapsed time between observations.

Figure 6:
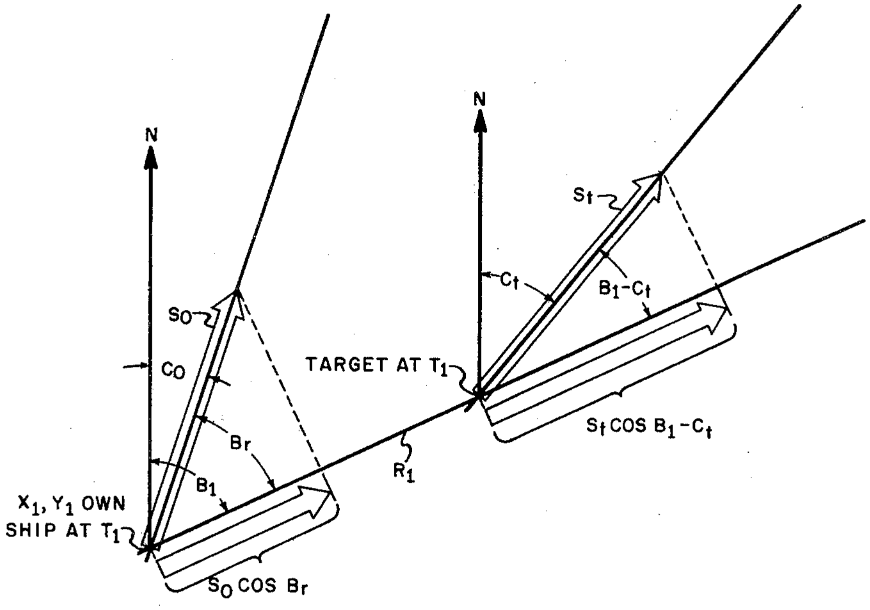

There are two forms of range-rate solution depending on which observation the range is taken. There are therefore two pairs or sets of simultaneous equations. One of the pair of equations for range-rate where range is taken on the first observation is the same as Equation 2 and is derived in the same manner and therefore could be mechanized in the error generator 26 according to Equation 18. The geometry for derivation of the other simultaneous equation for the range-rate case—range on first observation—is shown in FIG. 6 wherein own ship speed $S_o$ and target speed $S_t$ are resolved along the $R_1$ range line ($B_1$ bearing line) at time $T_1$. The difference between the components of target speed and own ship's speed along the range line is the range rate $\dot{R}$. It is positive if the component of target speed and own ship's speed are aiding, and negative if these components oppose each other. This is equated in terms of the values along the B bearing line to produce equation:

$$\dot{R}=S_t \cos (B_1-C_t)-S_o \cos B_r \qquad (32)$$

rewritten as $$S_o \cos B_r+\dot{R}-S_t \cos (B_1-C_t)=0 \qquad (33)$$

the second of the equations for the solution of the range-rate, range on first observation case.

One of simultaneous equations for that range-rate solution where range is taken on the second observation is the same as Equation 6 and is derived in the same manner, and therefore error generator 26 could be mechanized for the range-rate case according to Equation 18. The second equation for range-rate, range on second observation, is desired from the geometry of FIG. 7 and is as follows:

$$S_t \cos (C_t-B_2)+S_o \cos B_r-\dot{R}_2=0$$

and for error generator 28, is $$E_a=S_o \cos B_r+\dot{R}-S_t \cos (B_x-C_t) \qquad (38)$$

Outputs $E_a$ and $E_b$ are each equal to zero when $S_t$ and $C_t$ are correct. When $S_t$ and $C_t$ are incorrect, $E_a$ and $E_b$ have error values which reduce to zero when correct values of $S_t$ and $C_t$ are applied to inputs of the error generators 26 and 28 from the $S_t$ and $C_t$ servos.

From the general Formulas 21, 22, 23 and 24, the following error distribution Formulas 39 and 40 are obtained for the error generators 26 and 28 as mechanized in accordance with Equations 37 and 38.

$$dS_t=\frac{-E_a \cos (B_y-C_t)+E_b \sin (B_x-C_t)}{\cos (B_x-B_y)} \qquad (39)$$

$$dC_t=\frac{-E_a \sin (B_y-C_t)-E_b \cos (B_x-Ct)}{S_t \cos (B_x-B_y)} \qquad (40)$$

Equations 39 and 40 are mechanized as error detectors 31 and 29 in the error distrbutor 30 to provide output voltages representing $dS_t$ and $dC_t$ respectively to the $S_t$ and $C_t$ servomotors.

DATA MEMORY

The data memory 20 which supplies various inputs to the solution section 24 will be discussed before going into the details of the solution section mechanization. From the various equations, in accordance with which the error generators 26 and 28 and the error distributor 30 are selectively mechanized for the respective solution modes of the solution section 24, it is seen that the following input information is required to operate the system in the various modes described:

| | | | |
|---|---|---|---|
| Own ship movement data | Speed—$S_o$ | | |
| | Position relative to and travel along X and Y axes | $X_x$, $Y_x$, $X_y$, $Y_y$, $X_z$, $Y_z$, $X_y-Y_z$, $X_z-X_x$, $Y_y-Y_z$, and $Y_z-Y_x$ | |
| Time of and between observations | $T_x$, $T_y$, $T_z$, $T_y-T_z$, $T_z-T_x$ | | |
| Target data | Bearing information | Relative bearings $B_r$ | |
| | | True bearings B | $B_x$, $B_y$, $B_z$; Bearing differences $B_y-B_z$, $B_z-B_x$, $B_x-B_y$, $B_y-C_t$, $B_x=C_t$ |
| | Range information | Range R; Range rate $\dot{R}$ | |
| | Speed—$S_t$ | | |
| | Course—$C_t$ | | |

In this equation $S_o$ and $S_t$ are resolved along the $R_2$ range line ($B_2$ bearing-line).

It was stated that two equations for the range-rate case are respectively the same as Equations 2 and 6. These equations may be expressed in the general equation:

$$S_t \sin (B_y-C_t)+\frac{(X_y-X_z) \cos B_y-(Y_y-Y_z) \sin B_y-R_z \sin (B_x-B_y)}{T_y-T_z}=0 \qquad (35)$$

which is mechanized in the error generator 26 for the range rate solution to provide the output $E_b$. In Equation 18 for the range rate case, $B_x=B_z$, also, $X_x=Y_y$, $Y_x=Y_y$, and $T_x=T_y$, and the term $-R_z \sin (B_x-B_y)=R_z \sin (B_y-B_z)$. The substitutions are made to simplify mechanization. Equations 33 and 34 are similar and may be expressed in the general form:

$$S_o \cos B_r+\dot{R}-S_t \cos (B_x-C_t)=0 \qquad (36)$$

which is mechanized in the error generator 28 to provide the output $E_a$ for the range rate solution. Thus the equation for error generator 26 is:

$$E_b=S_t \sin (B_y-C_t)+\frac{(X_y-X_z) \cos B_y-(Y_y-Y_z) \sin B_y-R_z \sin (B_x-B_y)}{T_y-T_z} \qquad (37)$$

All the known and unknown quantities are represented by shaft positions in the target analyzer. $S_t$ and $C_t$ signals supplied to the inputs of the error detectors 26 and 28 are derived from the $S_t$ and $C_t$ servomotors. All the known quantities are derived from the data memory 20 which stores the known quantities as the observations are made (three observations for the three-bearing solutions and two observations each for the end-point and range-rate solutions).

Referring now to FIG. 8, which shows the shaft memories in the data memory 20, the input to the data memory includes B, T, X, Y, $\dot{R}$, $B_r$, $S_o$ and R, input shafts respectively indicated at 40, 42, 44, 46, 48, 50, 52, and 54, and whose individual angular positions are proportional to the information associated with the reference letter designation of the shaft. For example, the positions of the B and $B_r$ shafts 40 and 50 are respectively proportional to the true and relative target bearings, the positions of the X and Y shafts 44 and 46 are proportional respectively to the X and Y coordinates of own ship's position, the position of the T shaft 42 is proportional to time, the positions of the R and $\dot{R}$ shafts 54 and 58 are proportional respectively to the target range and range rate, and the position of the $S_o$ shaft 52 is proportional to own ship's speed. These shaft positions may be cranked in manually or they may be supplied by various well-known sensing devices, position plotting equipment, timing devices etc. aboard the own ship. All shafts are shown schematically by dashed lines. In many cases the same shaft or shafts controlled thereby appear in different parts of the same drawing or even in different drawings without physical linkage being shown. However, it is to be understood that they are physically linked, and to so indicate, they bear the same reference character (numbers or letters).

Each of the B, X, Y and T input shafts are coupled through a gear train (all the gear trains are labeled 56) and spring couplings (all spring couplings are labeled 58) to three subshafts, respectively designated by subscripts *x, y* and *z* associated with the reference letter of the input shaft to which the three shafts are coupled. For example, the shafts 60, 62 and 64, coupled to the B input shaft 40 are designated $B_x$, $B_z$ and $B_y$, in that order, and the shafts 66, 68 and 70 associated with the X input shaft 44 are designated $X_x$, $X_z$ and $X_y$, in that order. Likewise, the shafts 72, 74 and 76 coupled to the T shaft 42 are the $T_x$, $T_z$ and $T_y$ shafts, in that order, and the shafts 80, 82 and 84 coupled to the Y input shaft 46 are the $Y_x$, $Y_z$ and $Y_y$ shafts, in that order. The subscripted shafts may at times be referred to only by their subscript designation. For example, the $B_x$, $B_z$ and $B_y$ shafts may be referred to as the *x, z* and *y* bearing shafts. Likewise, all the shafts having the same subscript may be referred to collectively in terms of the subscript. For example, the $B_x$, $X_x$, $Y_x$ and $T_x$ shafts may be referred to as the *x* shafts. Each gear train 56 drives its group of subshafts at equal speeds in response to rotation of the associated input shaft. For example, the $B_x$, $B_z$ and $B_y$ shafts are driven at equal speeds in response to rotation of the B shaft.

Each of the *x, z, y* shafts and the $\dot{R}$ and $B_r$ shafts has associated therewith a brake for locking the shaft as desired to store the information on the shaft at a desired time. The respective brakes for the $B_x$, $B_z$ and $B_y$ shafts are at 90, 92 and 96; those for the $X_x$, $X_z$ and $X_y$ shafts at 98, 100 and 102; those for the $Y_x$, $Y_z$ and $Y_y$ shafts at 104, 106 and 108; and those for the $T_x$, $T_z$ and $T_y$ shafts at 110, 112 and 114. The brakes for the R and $B_r$ shafts are indicated at 116 and 118. The symbol for each brake includes an energizing winding, and the specific relation for consistent explanatory purposes, will be such that when energized, the brake will lock its associated shaft and will release the shaft when the brake is deenergized. In other figures, these brakes are symbolized only by their energizing windings.

Although gear trains and spring couplings are shown, the data input shafts may be coupled to the subshafts by servomechanisms if desired.

Each subshaft is maintained in alignment with its associated data input shaft by the spring coupling therebetween. When a subshaft is in alignment with its associated data input shaft its angular position is proportional to that of the data input shaft and both the data input and the subshaft have the same data value. For example, when the B shaft and the $B_x$ shaft are in alignment, and if the position of the B shaft represents a target bearing of 60°, then the position of the $B_x$ shaft will also represent 60°. When a subshaft is braked, it will store the information at the time of braking while the data input shaft may continue to rotate against the spring coupling. However, when the subshaft is unbraked, it will be snapped into alignment with its associated data input shaft by the spring coupling. When a subshaft and its associated data input shaft are not in alignment, they may be referred to as being relatively displaced.

A voltage proportional to the positon of the $\dot{R}$ shaft 48 is provided on a line 120 by a potentiometer 122, whose arm is controlled by the $\dot{R}$ shaft. The $B_r$ shaft 50 is coupled to drive the rotor of a resolver 124. The R shaft 54 is coupled to the arm of a control potentiometer 130 to provide on a line 132 a voltage proportional to the R shaft position. Line 132 supplies a motor 134 whose mechanical output is connected to a shaft 136 labeled $R_z$, whereby the position of the $R_z$ shaft is proportional to that of the R shaft. In turn, a voltage proportional to the position of the $R_z$ shaft is provided on a line 138 by a potentiometer 140 whose movable arm is coupled to the $R_z$ shaft. Line 132 is also connected through normally closed contacts $RR_1$ of a later described relay RR to the input of a motor 142 whose mechanical output is coupled to a shaft 144 designated as $R_x/S_o$ (meaning $R_x$ or $S_o$). A voltage proportional to the position of the $R_x/S_o$ shaft is provided on a line 146 by a potentiometer 148 whose arm is coupled to the $R_x/S_o$ shaft. The input of the motor 142 is alternatively connected through normally open contacts $RR_2$ of relay RR to a potentiometer 150 whose arm is coupled to the $S_o$ shaft 52, whereby when relay RR is operated, a voltage from potentiometer 150 proportional to the $S_o$ shaft position is supplied to the input of motor 142. Thus, depending on the status of the RR relay, the potentiometer 148 will supply on line 146, a voltage proportional to the position of either the $S_o$ shaft or the R shaft.

The $R_z$ and $R_x/S_o$ shafts have each associated therewith a brake for locking the shafts as desired. These brakes are indicated at 152 and 154 and are similar to those previously described.

The difference $B_z—B_x$ is provided on the output shaft 160 of a differential 162 whose inputs are driven in opposite directions by the $B_x$ and $B_z$ shafts. The operation of differential 162 is conventional. When the $B_x$ and $B_z$ shafts connected to the inputs of the differential 162 are unbraked, the inputs of the differential are at equal speeds and the differential output is zero. However, when one of the shafts coupled to the differential input is braked, the differential output shaft rotates in a direction dependent on which of its input shafts is braked. This rotation continues until the shaft connected to the other input of the differential is braked whereupon the angular position of the differential output will be proportional to the difference between the positions of the $B_x$ and $B_z$ shafts coupled to the inputs of the differential, as related to their original alignment with the B input shaft. All other differentials disclosed herein operate in the same manner. The output shaft 160 is coupled to the rotor of a resolver 164 to provide a rotor displacement proportional to $B_z—B_x$.

The difference $B_y—B_z$ is furnished on the output shaft 166 of a differential 168 whose inputs are coupled to the $B_z$ and $B_y$ shafts. Shaft 166 is coupled to the rotor of a resolver 170. The difference $B_x—C_t$ is obtained on the output shaft 172 of a differential 174 whose inputs are connected to the $B_x$ shaft and to the $C_t$ shaft 173 coupled to servomotor 34 (FIG. 1). The shaft 172 drives the rotor of the resolver 176. A differential 178 is driven by the $B_y$ and $C_t$ shafts to provide on the output shaft 180 of the differential, the difference $B_y—C_t$. Shaft 180 drives a resolver 182. The difference $B_x—B_y$ is obtained on the output shaft 184 of a differential 186 whose inputs are driven by the $B_x$ and $B_y$ shafts. Shaft 184 drives a resolver 188. The $B_x$ and $B_y$ shafts drive resolvers 190 and 192, respectively.

The output shaft 194 of a differential 196 driven by the $T_x$ and $T_z$ shafts, provides the difference $T_z—T_x$. Shaft 194 drives the movable arm of a potentiometer 198. Likewise, $T_y—T_z$ is provided on an output shaft 200 of a differential 202 whose inputs are driven by the $T_z$ and $T_y$ shafts. Shaft 200 drives the adjustable arm of a potentiometer 204. A differential 206 whose inputs are driven by the $X_x$ and $X_z$ shafts provides on its output shaft 208 a difference $X_z—X_x$. Shaft 208 drives the adjustable arm of a potentiometer 210 to provide a voltage proportional to the difference $X_y—X_x$. The difference $X_y—X_z$ is obtained in the same manner on the output shaft 212 of a differential 214 whose inputs are driven by the $X_z$ and $X_y$ shafts. Shaft 212 drives the arm of the potentiometer 216 to provide a voltage proportional to the difference $X_y—X_z$. The inputs of a differential 218 are driven by the $Y_x$ and $Y_z$ shafts to provide the difference $Y_z—Y_x$, on the output shaft 220 of the differential, shaft 220 being coupled to drive the movable arm of a potentiometer 222 to provide a voltage proportional to $Y_z—Y_x$. The difference $Y_y$ and $Y_z$ is obtained on the output shaft 224 of a differential 226 having inputs driven by the $Y_z$ and $Y_y$ shafts. Shaft 224 drives the arm of a potentiometer 228 to provide a voltage proportional to $Y_y—Y_z$.

The general nature of the storage function by the subshafts may be understood by considering one input data shaft and its subshafts, for example the X input shaft which represents own ship's travel east. The three subshafts $X_x$, $X_y$ and $X_z$ are all driven by the X shaft to represent own ship's travel east. Until an observation is taken the outputs of the $X_y—X_z$ and the $X_z—X_x$ shafts are zero. When the first observation is taken, one of the X subshafts is locked to represent $X_1$, the position east of own ship, and to serve as a reference for the measurement of easterly travel. For example, assume that the $X_x$ shaft is locked at the first observation (in the three-bearing mode-range on third observation) so that $X_x=X_1$. The $X_y—X_z$ shaft output remains zero because the $X_y$ and $X_z$ shafts have not been relatively displaced. The $X_z—X_x$ shaft output represents ship's travel east since the first observation. When the second observation is taken, the $X_y$ shaft is locked in position so that $X_y=X_2$. The $X_y—X_z$ shaft output now represents the distance east own ship has moved since the second observation. It should be noted that the output from the $X_z—X_x$ shaft continues to represent own ship travel east from the first observation. When the third observation is made, the $X_z$ shaft is locked so that $X_z=X_3$. The two outputs $X_y—X_z$ and $X_z—X_x$ now represent the easterly travel of own ship between the second and third observation, $X_2—X_3$, and between the first and third observations, $X_3—X_1$, respectively. These data are stored for use in the solution for target course $C_t$ and speed $S_t$. Because anv observation can be dropped and replaced with new information, any one of the three X shafts ($X_x$, $X_y$, or $X_z$) can represent the first, second or third observation data relating to own ship travel east.

In a similar manner own ship travel north (Y), bearing differences, and time intervals are measured and stored for use in the solution section. The various resolvers and potentiometers controlled by the shafts of the shaft memory are also shown in FIG. 10 which illustrates the solution section 24. The brakes in the data memory 20 are controlled by the programmer 22, which among other functions, programs the insertion and droping of observational data in response to commands of an operator. The programmer stores the observed data at each observation on the correct shaft memories.

PROGRAMMER 22

When an observation is inserted, the programmer locks the proper memory shafts, and remembers the order of insertion. Any observation may be dropped by operating the proper dropout switch. In such event, the programmer releases the proper brakes to receive a new observation, and in its own memory advances the order of the retained observation or observations as the case may be. It is important to note that only the observation memory in the programmer is concerned with chronology. The memory shafts have no chronological characterization. That is, each set of shafts (*x*, *y* or *z*) can accept any order of observation if the set is open. There is no transfer of information from one to another set of the *x*, *y*, and *z* shafts when an observation is dropped.

As seen in FIGS. 9(*a*), (*b*) and (*c*), the programmer 22 includes a mode selector switch MS, and a plurality of relays. The brakes of FIG. 8 are also shown in FIG. 9(*c*). Power for operating the relays and brakes comes from lines marked + and — respectively which are connected to a suitable power source. The relays and shaft brakes are symbolized by their operating windings. To simplify the diagrams, the operating links between the respective relays and their corresponding contacts are not shown. However, each contact controlled by each relay bears the relay reference plus a subscript number identifying the particular contact of the relay. Thus, $BU_1$, $BU_2$, $BU_3$ are contacts controlled by relay BU. Some relays of FIG. 9 also control contacts in FIGS. 8 and 10, wherein the contacts are identified by the relay reference. Each side of a relay switch arm and the contact facing it is referred to as a set of contacts. Thus, the case of a relay switch arm that normally touches a first contact to close one circuit, and, when the relay is operated, breaks the first circuit and touches a second contact to close a second circuit, the relay switch arm and the first contact are referred to as normally closed contacts, while the same switch arm and the second contact are referred to as normally open contacts. Switch MS has a plurality of ganged switch arms $MS_1$–$MS_6$ each engageable with three tops. An indicator $MS_7$ and an operating knob are linked to the switch arms. In its top position, the switch MS selects the end-point mode of operation, and applies power to a relay EP (end-point). In the middle position, switch MS selects the three-bearing mode and energizes a relay TB (three bearing). At the bottom position, switch MS selects the range-rate mode and energizes a relay RR (range-rate).

PROGRAMMER 22—SPECIFIC TO THREE-BEARING MODE

The function of the programmer 22 will be described mode by mode beginning with the three-bearing mode. In this mode three observations of target bearing B are taken at times $T_1$, $T_2$ and $T_3$, with target range also taken on any one of the observations. Thus, two observations are bearing-only observations, and the other one is a bearing-range observation. Other known quantities required for this mode of solution are own ship's position east and north at times $T_1$, $T_2$ and $T_3$, i.e. ($X_1$, $Y_1$), ($X_2$, $Y_2$), and ($X_3$, $Y_3$).

In the three-bearing mode, the programmer 22 performs as follows. When the operator inserts a bearing-range observation by operating a switch IBR (insert bearing range), regardless of the order of insertion (whether first, second or third observation), the programmer 22 locks the $R_x$ and $R_z$ shafts and the *z* subshafts ($B_z$, $T_z$, $X_z$ and $Y_z$), and remembers the order of insertion. When a bearing-only observation is inserted by operating a switch IBO (insert bearing only), the programmer locks the set of *x* shafts ($B_x$, $T_x$, $X_x$ and $Y_x$) if both *x* and *y* shafts are open, otherwise it locks whichever one of the *x* and *y* sets of shafts that is open. The programmer also memorizes the order of insertion. Any observation may be dropped by operating the appropriate dropout switch. For example, if the second observation is to be dropped, a DS2 drop-out switch is operated, whereupon the programmer releases the brakes on the shafts in which the second observation is stored, and in its own observation memory, the order of the original third observation is advanced to that of second observation, leaving the third observation order open. A new third observation is stored by locking the released shafts which formerly stored the second observation data. For example, if the set of *y* shafts were locked first, the set of *x* shafts second and the set of *z* shafts third, the dropping of the second observation would release the *x* shafts, leaving them open for a new third observation, while the *z* shafts are now memorized in the programmer as being the second observation.

The brakes are programmed in accordance with the following Tables I, II and III, by means whose description follows the tables.

*Table I*

THREE BEARING ANALYSIS BRAKING

[Range and bearing taken on first observation]

| | Column I First Observation | | Column II Second Observation | | Column III Third Observation | |
|---|---|---|---|---|---|---|
| Shaft | Locked at Time $T_1$ | Data Stored | Locked at Time $T_2$ | Data Stored | Locked at Time $T_3$ | Data Stored |
| $B_x$ | | | * | $B_2$ | | |
| $B_y$ | | | | | * | $B_3$ |
| $B_z$ | * | $B_1$ | | | | |
| $Y_x$ | | | * | $Y_2$ | | |
| $Y_y$ | | | | | * | $Y_3$ |
| $Y_z$ | * | $Y_1$ | | | | |
| $X_x$ | | | * | $X_2$ | | |
| $X_y$ | | | | | * | $X_3$ |
| $X_z$ | * | $X_1$ | | | | |
| $T_x$ | | | * | $T_2$ | | |
| $T_y$ | | | | | * | $T_3$ |
| $T_z$ | * | $T_1$ | | | | |
| $R_x$ | * | $R_1$ | | | | |
| $R_z$ | * | $R_1$ | | | | |

*Table II*

THREE BEARING ANALYSIS BRAKING

[Range and bearing taken on second observation]

| | Column I First Observation | | Column II Second Observation | | Column III Third Observation | |
|---|---|---|---|---|---|---|
| Shaft | Locked at Time $T_1$ | Data Stored | Locked at Time $T_2$ | Data Stored | Locked at Time $T_3$ | Data Stored |
| $B_x$ | * | $B_1$ | | | | |
| $B_y$ | | | | | * | $B_3$ |
| $B_z$ | | | * | $B_2$ | | |
| $Y_x$ | * | $Y_1$ | | | | |
| $Y_y$ | | | | | * | $Y_3$ |
| $Y_z$ | | | * | $Y_2$ | | |
| $X_x$ | * | $X_1$ | | | | |
| $X_y$ | | | | | * | $T_3$ |
| $X_z$ | | | * | $X_2$ | | |
| $T_x$ | * | $T_1$ | | | | |
| $T_y$ | | | | | * | $T_3$ |
| $T_z$ | | | * | $T_2$ | | |
| $R_x$ | | | * | $R_2$ | | |
| $R_z$ | | | * | $R_2$ | | |

*Table III*

THREE BEARING ANALYSIS BRAKING

[Range and bearing taken on third observation]

| | Column I First Observation | | Column II Second Observation | | Column III Third Observation | |
|---|---|---|---|---|---|---|
| Shaft | Locked at Time $T_1$ | Data Stored | Locked at Time $T_2$ | Data Stored | Locked at Time $T_3$ | Data Stored |
| $B_x$ | * | $B_1$ | | | | |
| $B_y$ | | | * | $B_2$ | | |
| $B_z$ | | | | | * | $B_3$ |
| $Y_x$ | * | $Y_1$ | | | | |
| $Y_y$ | | | * | $Y_2$ | | |
| $Y_z$ | | | | | * | $Y_3$ |
| $X_x$ | * | $X_1$ | | | | |
| $X_y$ | | | * | $X_2$ | | |
| $X_z$ | | | | | * | $X_3$ |
| $T_x$ | * | $T_1$ | | | | |
| $T_y$ | | | * | $T_2$ | | |
| $T_z$ | | | | | * | $T_3$ |
| $R_x$ | | | | | * | $R_3$ |
| $R_z$ | | | | | * | $R_3$ |

With reference to Tables I, II and III, if after three observations are taken, the first observation data are dropped and a new observation taken, column I will represent the third observation, column II will represent the first observation data, and column III will represent the second observation data. If after three observations are taken, the second observation data are dropped and a new observation taken, the third observation data will be that shown in column II and the second observation data that shown in column III. If the third observation data are dropped and a new observation taken, the column headings are not affected. All the subscripts in each column should be changed to correspond to the observation order represented by the column. Thus, in Table I, when, as a result of dropping the first observation data, column I represents the third observation data, $B_3$, $Y_3$, $X_3$, $R_3$ and $T_3$ are stored on the respective *z* shafts, that is on $B_z$, $Y_z$, $X_z$, $R_z$ and $T_z$, at time $T_3$, $R_3$ is stored on both the $R_x$ and $R_z$ shafts.

The programmer has an insertion section which includes insertion switches IBO (insert bearing only) and IBR (insert bearing-range) and relays BO (bearing only), IB (insert bearing), BR (bearing-range), IR (insert range), and a slow-to-operate and fast release relay IC (information complete). After each insertion of an observation and the storage thereof, the relay IC is operated to recycle the insertion section and reset its relays in position to receive a new observation.

When switch MS is in the three-bearing position, the operator inserts three observations of target bearing B. A target range input accompanies one of the three bearing inputs. This is accomplished by depressing the IBO switch twice, once for each bearing-only insertion, and the IBR switch once. The three insertions can be in any order. Thus, the bearing-range observation can be inserted on the first, second, or third observation.

Assume that switch MS is in the three-bearing position and relay TB is energized (operated). When energized, relay TB in FIGS. 9(*a*) and (*b*) closes normally open contacts $TB_1$ and $TB_2$, and opens normally closed contacts $TB_3$ and $TB_4$, and in FIGS. 10(*a*) and (*b*), energized relay TB closes normally open contacts $TB_5$, $TB_8$, $TB_9$ and $TB_{12}$, normally closed contacts $TB_6$, $TB_7$, $TB_{10}$ and $TB_{11}$. Relay TB, when energized also operates the four arms of a switch $TB_{13}$ (FIG. 10(*b*)) in the upward direction. If the first observation is bearing-only, it is inserted by depressing switch IBO which closes an energizing circuit to relay BO through normally closed contacts $IC_1$ of relay IC, normally closed contacts $BR_1$ of relay BR, and normally closed contacts $EP_1$ of relay EP. Relay BO, when energized, closes normally open contacts $BO_1$, $BO_2$, $BO_3$, $BO_4$, $BO_5$, and opens normally closed contacts $BO_6$. Relay BO is held through contacts $BO_1$ and $IC_1$. Relay IB is energized through contacts $BO_2$, and closes normally open contacts $IB_1$, $IB_2$, $IB_3$, $IB_4$, $IB_5$, $IB_6$, and opens normally closed contacts $IB_7$. Relay BU is operated through contacts $BO_3$ and $IB_2$, and closes contacts $BU_1$, $BU_2$, $BU_3$, $BU_4$ and $BU_5$.

Closure of $BU_4$ and $BU_5$ locks the $X_x$, $Y_x$, $B_x$ and $T_x$ shaft brakes 98, 104, 90 and 110, to store $X_1$, $Y_1$, $B_1$ and $T_1$. Contacts $TB_1$, $IB_4$ and $BO_5$, are in the energizing path to a relay BV. However, this relay cannot be energized until a second bearing-only observation is inserted on either the second or third observation. The hold circuit H1 for relay BU, which is held through $BU_1$ even after recycling by relay IC, will be described later. After a delay, relay IC is operated through contacts $IB_3$ and $BO_4$, and breaks the hold circuits to relays BO and IB, thereby recycling the apparatus for the next observation. Upon release of relay IB, a relay BUA is operated through $IB_7$ and $BU_2$. Relay BUA closes normally open contacts BUA, $BUA_2$ and $BUA_3$, and holds through contacts $BU_2$ and $BUA_1$. Contacts $BUA_2$ condition relay BV for operation on the next bearing-only insertion.

Contacts $BU_3$ complete an energizing path to a relay BU1A through normally closed contacts $BW1A_1$ and $BV1A_1$ of relays BW1A and BV1A respectively. Relay BU1A, when operated, closes normally open contacts $BU1A_3$ and $BU1A_4$, and opens normally closed contacts $BU1A_1$ and $BU1A_2$. Opening of contacts $BU1A_1$ and $BU1A_2$ inhibit operation of relays BV1A and BW1A respectively. Contacts $BU1A_3$ complete an energizing path to a relay BU1 through normally closed contacts $BW1_1$ and $BV1_1$ of relays BW1 and BV1 respectively. When operated, relay BU1 closes normally open contacts $BU1_1$, $BU1_3$, $BU1_7$ and $BU1_{10}$, and opens normally closed contacts $BU1_2$, $BU1_4$, $BU1_5$, $BU1_6$, $BU1_8$ and $BU1_9$. Opening of contacts $BU1_4$, $BU1_5$ and $BU1_6$, inhibit operation of relays BV1, BW1 and BU2 respectively. Relay BU1 is a memory relay, and being operated it stores the information that the first observation went to relay BU and locked the $B_x$, $T_x$ and $Y_x$ shafts 60, 72, 66 and 80, i.e. relay BU is first, and the $B_x$, $T_x$, $X_x$ and $Y_x$ shafts are first with $B_1$, $T_1$, $X_1$ and $Y_1$ stored on them.

Assume that the second observation is a bearing-range observation, i.e. target range is inserted with the second target bearing observation. This observation is inserted by depressing switch IBR which energizes a relay BR through contacts $BO_6$ and IC. When operated, relay BR closes normally open contacts $BR_2$, $BR_3$, $BR_4$ and $BR_5$, and opens normally closed contacts $BR_1$. Relay BR holds through contacts $BR_3$ and $IC_1$. Relay IR is energized through contacts $BR_4$ and $IC_1$, to close normally open contacts $IR_1$, $IR_2$, $IR_3$ and $IR_5$, and open normally closed contacts $IR_4$. Closure of contacts $BR_2$ operates relay IB. Relay IR holds through $IR_1$ and $IC_1$. Contacts $IR_5$ and $EP_5$ complete the circuit to energize a relay RW which then closes normally open contacts $RW_1$, $RW_2$ and $RW_3$. Relay RW holds through $RW_1$ and the BW hold circuit H2. Contacts $RW_3$ close the energizing circuits to the $R_x$ and $R_z$ shaft brakes 154 and 152. This stores range $R_2$ (target range at time $T_2$) on the $R_x$ and $R_z$ shafts 144 and 136 respectively. Contacts $BUA_3$, $BR_5$ and $IB_5$ close the energizing circuit to a relay BW. The latter relay, upon operation, closes normally open contacts $BW_1$, $BW_2$, $BW_3$ and $BW_4$. The hold circuit H2 for relay BW through contacts $BW_1$ will be described later.

Contacts $BW_2$ close the energizing circuit to the relay BW2 which then closes normally open contacts $BW2_1$, $BW2_2$, $BW2_5$ and $BW2_6$, and opens normally closed contacts $BW2_3$, $BW2_4$, $BW2_7$. Closure of contacts $BW_3$ and $BW_4$ energizes the $B_z$, $T_z$, $X_z$ and $Y_z$ shaft brakes 92, 112, 100 and 106 respectively. Thus, storing $B_2$, $T_2$, $X_2$ and $Y_2$ on the $B_z$, $T_z$, $X_z$ and $Y_z$ shafts 62, 74, 68 and 82. Relay BW2 being operated, indicates that the second observation is stored on the *z* shafts 62, 74, 68 and 82. Open contacts $BW_3$ and $BW_4$ inhibit the operation of relays BU2 and BV2. This means that the second observation is not stored on either the *x* shafts ($B_x$, $T_x$, $X_x$, $Y_x$) or the *y* shafts ($B_y$, $T_y$, $X_y$, $Y_y$). After a delay, relay IC is energized through contacts $IR_2$ and $IB_3$, whereupon the hold circuits to relays IB, IR and BR are broken to reset these relays for the next observation.

Since the second observation was a bearing-range observation, the third observation must now be a bearing-only observation. This is inserted by depressing switch IBO. Relays BO and IB are energized as described in the first observation. Relay BV is operated through contacts $IB_1$, $BO_5$, $IB_4$ and $BUA_2$. Operation of BV closes normally open contacts $BV_1$, $BV_2$, $BV_3$. The hold circuit H3 for relay BV through contacts $BV_1$ will be described later. Closure of contacts $BV_3$ energizes the *y* shaft brakes 96, 102, 108 and 114. Relays BV1 and BV2 are inhibited by open contacts $BU1_4$ and $BW2_4$. Relay IC operates to recycle the insertion relays BO and IB. Since BV1 and BV2 are unoperated while relay BV is operated, relay BV and the *y* shaft brakes must have been operated third. The *y* shafts 74, 70, 76 and 84 store the third observation, while relay BV operated and relays BV1 and BV2 unoperated is a memory condition in the observation memory indicating that the information on the *y* brakes operated by relay BV is from the third observation. The insertion order of the three observations just described has been *x*, *z*, *y*, that is the *x* shaft brakes were locked first, the *z* shafts second and the *y* shafts third. The data from the three observations as represented by the storage shaft positions is used to provide the input information to the solution section for the solution of target speed $S_t$ and target course $C_t$.

The relay operation representing other possible insertion orders will be discussed before describing the observation dropping circuit and the BU, BW and BV hold circuits.

In the three-bearing mode, relay BU is identified with the *x* shaft brakes 90, 98, 104 and 110, relay BW with the *z* shaft brakes 92, 100, 106 and 112, relay BV with the *y* shaft brakes 96, 102, 108 and 114, and relay RW with the range shaft brakes 152 and 154. The *z* shaft brakes are identified with the observation on which range is taken.

It should be recalled at this time that the *x*, *y* and *z* shafts can take observation in any order, and that a bearing-only observation is inserted in the BU relay if both BU and BV relays are open (unoperated), otherwise the bearing-only observation is inserted in whichever of relays BU and BV is open to receive information. All observations on which range is taken are identified with the BW relay.

The relay operation for the insertion order *x*, *z*, *y* has been described. Thus, the effect of *x* (relay BU and *x* shafts) being first has been discussed. Consider now the effect of *x* being second. In this case, after relay BU has been energized to lock the *x* shafts by the insertion of a bearing-only observation in the manner previously described, a relay BU2 is operated through contacts $BU1_6$, $BW2_3$, $BV2_3$, and relays BU1, BV2 and BW2 are inhibited. Operation of relay BU2 closes normally open contacts $BU2_1$, $BU2_3$, $BU2_4$, $BU2_7$ and opens normally open contacts $BU2_2$, $BU2_5$, $BU2_6$, $BU2_8$. Operation of relay BU2 indicates that the *x* shafts are second. When the *x* shafts are third, relay BU again operates as before to lock the $x$ shafts. However, in this case, relays BU1 and BU2 are inhibited, thus "indicating" that if BU ($x$ shafts) are not first, and not second, they must be third.

Effects of $z$ (BW and associated $z$ shafts) being second have been described. When BW and the $z$ shafts are first, after operation of relay BW in the manner previously described, relays BW1A and BW1 are energized (BW1A through closed contacts $BV1A_2$, $BU1A_2$ and BW2, and BW1 through closed contacts $BU1_5$, $BV1_5$ and $BW1A_3$), and relays BW2, BU1 and BV1 are inhibited, thus indicating that relay BW and the $z$ shafts are first. When operated, relay BW1A closes normally open contacts $BW1A_3$ and $BW1A_4$ and opens normally closed contacts $BW1A_1$ and $BW1A_2$. Operated relay BW1 closes normally open contacts $BW1_1$ and $BW1_4$ and opens normally closed contacts $BW1_2$, $BW1_3$ and $BW1_5$. If $z$ shafts are third, relay BW is again operated, and relays BW1 and BW2 are inhibited. This relay condition "says" that if $z$ is not first or second, then it must be third.

Relay conditions for $y$ shafts (and BV relay) being third have been discussed. The $y$ shafts can be first only if an observation has been dropped advancing $y$ from second or third to first. When the $y$ shafts are first and relay BV has been operated as previously described, relays BV1A and BV1 are operated (BV1A through closed contacts BV2, $BW1A_2$ and $BU1A_1$, and BV1 through closed contacts $BU1_4$, $BV1A_3$ and $BW1_3$), and relays BV2, BU1, and BW1 are inhibited, thus indicating that the first observation is in relay BV and the $y$ shafts. Relay BV1A, when operated, closes normally open contacts $BV1A_3$, $BV1A_4$, $BV1A_5$ and opens normally closed contacts $BV1A_1$, $BV1A_2$. Operated relay BV1 closes normally open contacts $BV1_2$, $BV1_4$, $BV1_7$, $BV1_9$, and opens normally closed contacts $BV1_1$, $BV1_3$, $BV1_5$, $BV1_6$, $BV1_8$, $BV1_{10}$. When the $y$ shafts are second, after relay BV has operated as before, relay BV2 is operated and relays BV1, BW2 and BU2 are inhibited, thus indicating that the second observation has been entered in relay BV and its associated $y$ shafts. Operated relay BV2 closes normally open contacts $BV2_1$, $BV2_4$, $BV2_9$, $BV2_6$, $BV2_8$, and opens normally closed contacts $BV2_2$, $BV2_3$, $BV2_5$, $BV2_7$.

It should now be apparent that relays BU1, BV1 and BW1 mutually inhibit each other, i.e. only one of these relays can be operated at any given time. The same is true with relays BU2, BV2 and BW2. Also, relay BU1 inhibits relay BU2, relay BV1 inhibits relay BV2, and relay BW1 inhibits relay BW2.

The hold circuits H1, H2 and H3 for relays BU, BW and BV, include contacts operated by drop-out relays D1, D2 and D3, which are respectively energized by manual drop-out switches DS1, DS2 and DS3. When operated, relay D1 opens normally closed contacts $D1_1$, $D1_2$ and $D1_3$ and closes normally open contacts $D1_4$, $D1_5$ and $D1_6$. Operated relay D2, opens normally closed contacts $D2_1$, $D2_2$ and $D2_3$ and closes normally open contacts $D2_4$. Relay D3, when operated, opens normally closed contacts $D3_1$, $D3_2$, $D3_3$.

The hold circuit H1 for relay BU includes contacts $BU1_1$, $BU1_2$, $BU2_1$, $BU2_2$, $D1_1$, $D2_1$, $D3_1$ and $BU_1$ arranged so that hold circuit is broken only in response to the operation of that one of the drop-out relays D1, D2 and D3 whose modifying reference number is the same as the order of observation entered into relay BU and the $x$ shafts. In other words, relay BU is released only when it is storing the data that are to be dropped. For example, operation of relay D1 opens the BU hold circuit only if relay BU and the $x$ shafts contain the first observation. Likewise, if relay BU and the $x$ shafts were second, the hold circuit is broken only by operation of relay D2. Similarly, relay D3 breaks the hold circuit only if the third observation is stored in BU and the $x$ shafts.

Contacts $D1_1$ and $D2_1$ are paralleled by contacts $BU1_2$ and $BU2_2$, respectively. Relays BU1 and BU2 are operated when relay BU is energized on the first or second observations respectively. If neither of relays BU1 and BU2 are energized, relay BU can be released only when drop-out relay D3 is energized. If relay BU is first, relay BU1 is energized, and contacts $D2_1$ and $D3_1$ are shorted by contacts $BU2_2$ and $BU1_1$ respectively, and relay BU can be released only when relay D1 is energized. When relay BU is second, relay BU2 is operated. This short circuits the contacts $D1_1$ and $D3_1$, and permits relay BU to be released only when relay D2 is energized.

Hold circuit H3 for relay BV includes contacts $BV1_2$, $BV1_3$, $BV2_1$, $BV2_2$, $D1_2$, $D2_2$, $D3_2$ and $BV_1$, arranged in the same manner as in the hold circuit H1 for the BU relay to provide similar operation, whereby operation of relay D1 breaks the BV hold circuit H3 only if relay BV and the $y$ shafts are first; D2, operated, breaks this hold circuit only when relay BV and the $y$ shafts are second; and operation of D3 breaks the BV hold circuit H3 only when relay BV and the $y$ shafts contain the third observation.

Hold circuit H2 for the relay BW includes contacts $BW1_1$, $BW1_2$, $BW2_6$, $BW2_7$, $D1_3$, $D2_3$, $D3_3$ and $BW_1$, arranged as those in the BU and BV hold circuits H1 and H3 for similar operation with respect to relay BW.

Any observation may be dropped and a new one added. When any other than the third observation is dropped, the orders of the remaining observations are automatically advanced in the observation memory of the programmer and when a new observation is inserted it is remembered as the new third observation in the programmer. An observation is dropped by depressing the appropriate drop-out switch to operate the associated relay which breaks the hold circuit to the relay containing the observation being dropped. For example, if it is desired to drop the second observation, the switch DS2 is closed to operate relay D2 which breaks the hold circuit to whichever of relays BU, BW and BV is second. However, while energized, relay KD2 holds "in" whichever of the memory relays BU2, BV2 or BW2 was "in," thereby inhibiting any advance until the drop operation is completed. When relay D2 is deenergized by opening switch DS2, the memory relay that was "in" (BU2, BV2 or BW2) is released, thus permitting the former third observation to advance and become the second observation. The memory shafts which held the dropped second observation are now open to receive a new third observation. As a more specific example, suppose the insertion order is $x$, $y$, $z$. If the second observation is dropped, $x$ remains first, $z$ is advanced by the programmer to second, and $y$ is open to receive a new third observation. In the insertion order $x$, $y$, $z$, relays BU, BV, BW, BU1, BV2 and BU1A are in (energized). Relay BV2 inhibits relays BU2 and BW2. When relay D2 is energized by closing drop-out switch DS2, relay BV2 is held in by relay D2 while the hold circuit H3 for relay BV is broken. When the drop-out switch DS2 is released (opened), relay D2 is released, thereby releasing relay BV2. This energizes relay BW2 thereby advancing the order of the observation stored on the $z$ shafts from third to second. Relay BV having been released, it is open to receive a new third observation for storage on the $y$ shafts.

The mechanics for dropping the first observation are similar for any insertion order. This will be explained with the insertion order $x$, $y$, $z$, as an example. Relays BU, BV, BW, BU1, BV2 and BU1A are in. Relay BU1 inhibits relays BV1 and BW1, while relay BV2 inhibits relays BU2 and BW2. When relay D1 is operated by closing drop-out switch DS1, relays BU and BU1A are released, relay BV1A is energized, and relays BU1 and BV2 are held in by relay D1. When switch DS1 is opened, release of relay D1 releases relays BU1 and BV2 with the old information and energizes relays BV1 and BW2. Relays BV, BV1A, and BW remain energized. The order of the information on the $y$ shafts operated by relay BV has been advanced from second to first, while the order of the observation stored in the *z* shafts operated by relay BW has been advanced from third to second, and relay BU and the *x* shafts are now open to receive a new third observation. In the case where the observation dropped contains the range, relay RW is released when the hold circuit H2 for relay BW is broken by the energized drop-out relay (D1, D2 or D3), thus permitting the receipt of range information with the new third observation.

PROGRAMMER 22—END-POINT CASE

In this mode two observations are taken, each with bearing and range. Other known quantities required for this mode of solution are own ship's position east and north at times $T_1$ and $T_2$, i.e. ($X_1$, $Y_1$) and ($X_2$, $Y_2$).

In the end-point mode, the programmer 22 functions as follows. If there is no observation stored in the system, the first observation is inserted by closing the IBR switch, and the programmer 22 operates relays BU and RU to lock the $X_x$, $X_y$, $Y_x$, $Y_y$, $T_x$, $T_y$, $B_y$ and $R_x$ shafts and remembers the order of insertion. The next observation is inserted by closing switch IBR, and the programmer operates relays BW and RW to lock the $X_z$, $Y_z$, $B_z$, $T_z$ and $R_z$ shafts, and remembers the order of insertion. Either observation can be dropped and a new one inserted. If the information stored through relays BU and RU is first, and relays BU and RU are released by a drop-out relay, the information stored through relays BW and RW becomes the first observation and the new second observation is inserted into relays BU and RU and their associated shafts.

Programmer 22 programs the brakes in the end-point mode in accordance with the following Table IV, by later described means.

*Table IV*

END POINT ANALYSIS BRAKING

| Shaft | Column I First Observation | | Column II Second Observation | |
|---|---|---|---|---|
| | Locked at Time $T_1$ | Data Stored | Locked at Time $T_2$ | Data Stored |
| $B_x$ | | | * | $B_2$ |
| $B_y$ | * | $B_1$ | | |
| $B_z$ | | | * | $B_2$ |
| $Y_x$ | * | $Y_1$ | | |
| $Y_y$ | * | $Y_1$ | | |
| $Y_z$ | | | * | $Y_2$ |
| $X_x$ | * | $X_1$ | | |
| $X_y$ | * | $X_1$ | | |
| $X_z$ | | | * | $X_2$ |
| $T_x$ | * | $T_1$ | | |
| $T_y$ | * | $T_1$ | | |
| $T_z$ | | | * | $T_2$ |
| $R_x$ | * | $R_1$ | | |
| $R_z$ | | | * | $R_2$ |

With respect to Table IV, if, after two observations of range and bearing, the first observation is dropped and another taken, the column headings "First Observation" and "Second Observation" should be interchanged. If the second observation is dropped, there is no change. When the column headings are changed, the subscripts in each column should be changed to correspond to the observation order represented by the column. Thus, if column I represents the second observation, then data $B_2$, $Y_2$, $Y_2$, $X_2$, $X_2$, $T_2$, $T_2$ and $R_2$ will be stored on the $B_y$, $Y_x$, $Y_y$, $X_x$, $X_y$, $T_x$, $T_y$, and the $R_x$ shafts, respectively.

For the end-point solution, selector switch 240 is operated to the top position marked END-POINT. In this mode, relay EP is operated, and in this position it closes normally open contacts $EP_2$, $EP_4$, $EP_6$, (FIGS. 9(*a*), (*c*)), $EP_8$, $EP_{10}$, and $EP_{12}$ (FIG. 10(*a*)), and opens normally closed contacts $EP_1$, $EP_3$, $EP_5$, (FIG. 9(*a*)), $EP_7$, $EP_9$, and $EP_{11}$ (FIG. 10(*a*)). Each observation in the end-point mode is inserted by closing switch IBR. When switch IBR is closed, relays BR, IR, and IB are operated as heretofore described for the three-bearing mode. If there is no information stored in system, relays BU and RU are operated through closed contacts $EP_2$ and $IB_6$ for relay BU, and closed contacts $EP_4$ and $IR_8$ for relay RU. After a delay, operated relay IC recycles the insertion circuit to reset relays BR, IR, and IB. Relay RU, when operated, closes normally open contacts $RU_1$, $RU_2$, $RU_3$ $RU_4$, and $RU_5$. Relay RU is held through contacts $RU_1$ and hold circuit H1. The $R_x$ shaft brake 154 is locked through closed contacts $RU_5$ and selector switch 240. The $X_x$, $X_y$, $Y_x$, $Y_y$, $T_x$, $T_y$ and $B_y$ shaft brakes 98, 102, 104, 108, 110, 114 and 64, respectively, are locked through closed contacts $BU_4$ and $BU_5$ and the selector switch MS. Relays BU1A and BU1 are operated, and relays BU2, BV1A, BV1, BW1A and BW1 are inhibited as in the three-bearing mode operation. Operated relays BU1A and BU1 indicate that relays BU and RU and shafts controlled thereby have the first observation. In short, relays BU and RU are first.

Relay BUA is conditioned for operation after recycling by relay IC as in the three-bearing mode operation. Closed contacts $RU_2$ condition relay RUA for operation after relay IR is released when relay IC resets the insertion relays. Until relays BUA and RUA are operated, no information can be inserted in relays BW and RW and the shafts controlled thereby. At the end of the first insertion, the information $B_1$ is stored on the $B_y$ shaft, $Y_1$ on the $Y_x$ and $Y_y$ shafts, $X_1$ on the $X_x$ and $X_y$ shafts, $T_1$ on the $T_x$ and $T_y$ shafts, and $R_1$ on the $R_x$ shaft.

To insert the second observation switch IBR is again closed to operate relays BR, IB and IR as in the first observation. Relay BW is operated through contacts $BUA_3$, $BR_5$ and $IB_5$. Relay BW2 is operated and relays BW1, BU2 and BV2 are inhibited as in the three-mode case. Relay RUA is operated through contacts $RU_2$ and $IR_4$. Operated relay RUA closes normally open contacts $RUA_1$ and $RUA_2$. Relay RUA holds through contacts $RU_2$ and $RUA_1$. Closed contacts $IR_5$ and $RUA_2$ complete the circuit to energize a relay RW.

The $B_z$, $X_z$, $Y_z$ and $T_z$ shaft brakes 92, 100, 106 and 112, respectively, are locked through closed contacts $BW_3$ and $BW_4$. The $B_x$ shaft brake 90 is locked through closed contacts $BW_3$ and the selector switch MS, while the $R_z$ shaft brake 152 is locked through closed contacts $RW_3$. Operated relay BW2 indicates that relays BW and RW and shafts operated thereby hold the second observation, i.e. relay BW and RW are second. Delayed operation of relay IC resets the insertion relays. After the insertion of the second observation the information $B_2$ is stored on the $B_x$ and $B_z$ shafts, $Y_2$ is stored on the $Y_z$ shaft, $X_2$ on the $X_z$ shaft, $T_2$ on the $T_z$ shaft, and $R_2$ on the $R_z$ shaft.

Either observation may be dropped. If the observation stored through relays BW and RW is dropped, it merely releases relays BW and RW and associated circuitry for the receipt and storage of a new second observation. However, if the observation stored through relays BU and RU is dropped, the observation stored through relays BW and RW, while remaining on the shafts where originally stored, becomes the first observation, and the new second observation is inserted through relays BU and RU to the shafts controlled thereby.

Assume that relays BU and RU and associated shafts are first (hold first observation), and relays BW and RW and the shafts controlled thereby are second (hold the second observation). When drop-out switch DS1 is closed and relay D1 operated, relays BU and BU1A are released, relay BW1A is energized, and relays BU1 and BW2 are held in by operated relay D1. When switch DS1 is opened and relay D1 released, relays BU1 and BW2 are released, and relay BW1 is energized. Operated relays BW1 and BW1A indicate that relays BW and RW and shafts controlled thereby are now first. Released relays BU and RU and shafts controlled thereby are open to receive a new second observation.

Assume now that relays BW and RW are first and relays BU and RU are second. Operation of drop-out relay D1 will release relays BW and BW1A, relay BU1A will be energized, and relays BW1 and BU2 are held in by operated relay D1. When relay D1 is released, relays BU and BU1A stay in, relays BW1 and BU2 are released and relay BU1 is energized. Thus, relays BU and RU and the shafts locked thereby are advanced to become first. Relays BW and RW and the shafts controlled thereby are open to receive a new second observation.

PROGRAMMER 22—RANGE-RATE MODE

In this mode two observations are inserted in any order at times $T_1$ and $T_2$. One of the observations is a true target bearing-only observation, while the other includes true target bearing, target range, and range-rate. Additional input information required for this mode are own ship position east ($X_1$, $Y_1$) and north ($X_2$, $Y_2$) at both observations, and relative target bearing and own ship speed on the range observations.

Programmer 22 functions as follows for the range-rate mode. The bearing-only observation is inserted by closing the switch IBO. The programmer then locks the $B_y$, $Y_y$, $X_y$ and $T_y$ shafts through relay BU. The observation including bearing range, and range-rate, is inserted by closing switch IBR. The programmer then locks the $Y_z$, $X_z$, $T_z$, $B_x$ and $B_r$ shafts through relay BW, and the $R_z$ and $\dot{R}$ shafts through relay RW. Either observation may be dropped, whereupon the remaining one, if not first, will be advanced to be the first observation.

Programmer 22 programs the brakes in accordance with the following Tables V and VI by later described means.

*Table V*

RANGE RATE ANALYSIS BRAKING

[Range and Range Rate on First Bearing]

| Shaft | Column I First Observation | | Column II Second Observation | |
|---|---|---|---|---|
| | Locked at Time $T_1$ | Data Stored | Locked at Time $T_2$ | Data Stored |
| $B_x$ | * | $B_1$ | | |
| $B_y$ | | | * | $B_2$ |
| $B_r$ | * | $B_{r1}$ | | |
| $Y_x$ | | | | |
| $Y_y$ | | | * | $Y_2$ |
| $Y_z$ | * | $Y_1$ | | |
| $X_x$ | | | | |
| $X_y$ | | | * | $X_2$ |
| $X_z$ | * | $X_1$ | | |
| $T_x$ | | | | |
| $T_y$ | | | * | $T_2$ |
| $T_z$ | * | $T_1$ | | |
| $S_o$ | * | $S_{o1}$ | | |
| $R_z$ | * | $R_1$ | | |
| $\dot{R}$ | * | $\dot{R}_1$ | | |

*Table VI*

RANGE RATE ANALYSIS BRAKING

[Range and range rate on second bearing]

| Shaft | Column I First Observation | | Column II Second Observation | |
|---|---|---|---|---|
| | Locked at Time $T_1$ | Data Stored | Locked at Time $T_2$ | Data Stored |
| $B_x$ | | | * | $B_2$ |
| $B_y$ | * | $B_1$ | | |
| $B_r$ | | | * | $B_{r2}$ |
| $Y_x$ | | | | |
| $Y_y$ | * | $Y_1$ | | |
| $Y_z$ | | | * | $Y_2$ |
| $X_x$ | | | | |
| $X_y$ | * | $X_1$ | | |
| $X_z$ | | | * | $X_2$ |
| $T_x$ | | | | |
| $T_y$ | * | $T_1$ | | |
| $T_z$ | | | * | $T_2$ |
| $S_o$ | | | * | $S_{o2}$ |
| $R_z$ | | | * | $R_2$ |
| $\dot{R}$ | | | * | $\dot{R}_2$ |

With respect to Tables V and VI, if, after two observations are taken, the first observation is dropped and another observation taken, the column headings "First Observation" and "Second Observation" should be interchanged. If the second observation is dropped and another observation taken, these column headings should not be interchanged. The subscripts in each column should be changed to conform to the observation order as indicated by the column heading.

Figure 9C:
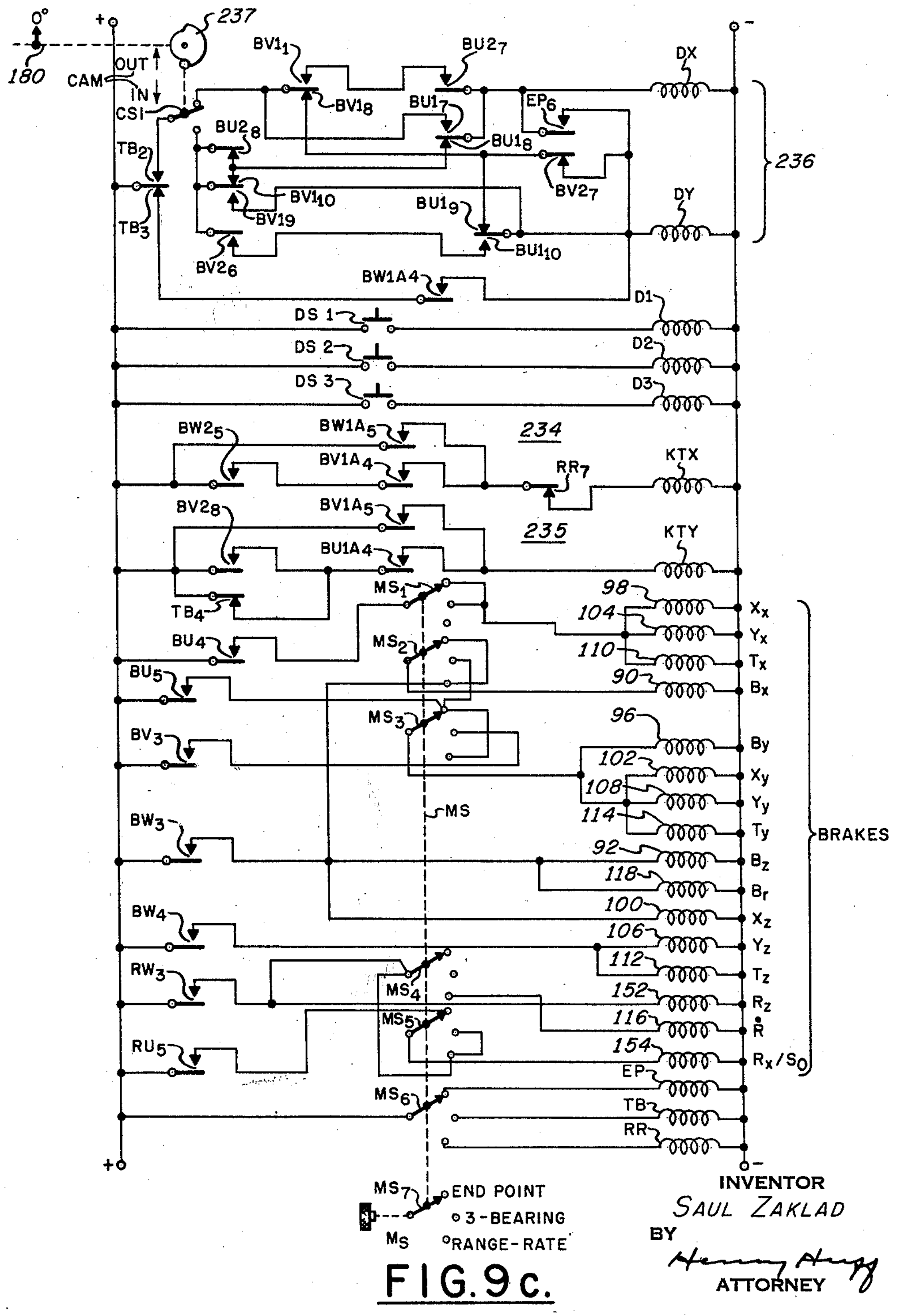

For the range-rate mode, selector switch MS is operated to the bottom position marked R-Rate. In this mode, relay RR is operated to close normally open contacts $RR_2$ (FIG. 8), $RR_3$ and $RR_5$ (FIG. 10*b*), and open normally closed contacts $RR_1$ (FIG. 8), $RR_4$, $RR_6$ (FIG. 10*a*), and $RR_7$ (FIG. 9*c*). The bearing-only observation is inserted by closing switch IBO. When this switch is closed, relays BO, IB, BU, BU1A, and BU1 are operated, and relays BU2 and BW1 are inhibited as previously described for the three-bearing mode. The $B_y$, $X_y$, $Y_y$ and $T_y$ shaft brakes 96, 102, 108 and 114 are locked through closed contacts $BU_5$ and the selector switch MS. The information $B_1$, $X_1$, $Y_1$ and $T_1$ is now stored on the $B_y$, $X_y$, $Y_y$ and $T_y$ shafts 64, 70, 84 and 76 respectively. The insertion relays BO and IB are reset by delayed operation of relay IC.

The observation including bearing, range and range-rate, is inserted by closing switch IBR. When this switch is closed, relays BR, IR, IB, BW, BW2 and RW are energized, and relay BU2 and BW1 stand inhibited, as previously described for the three-bearing mode. The $Y_z$ and $T_z$ shaft brakes 106 and 112 are locked through closed contacts BW, the $B_r$ and $X_z$ shaft brakes 118 and 100 are locked through closed contacts $BW_4$, and the $B_x$ shaft brake 90 is locked through contacts $BW_3$ and the selector switch 240. The information $B_2$ and $B_{r2}$ are now stored on the $B_x$ and $B_r$ shafts 60 and 50, information $Y_2$, $X_2$ and $T_2$ on the $Y_z$, $X_z$ and $T_z$ shafts 82, 68 and 74, information $S_{o2}$ and R2 on the $S_o$ and $R_z$ shafts 144 and 136, and the information $\dot{R}$ on the $\dot{R}$ shaft 48. The insertion relays BR, IR and IB are reset by delayed operation of relay IC.

If the previously described insertion order of bearing-only first (relay BU first) and bearing-range and range-rate second (relays BW and RW second), had been reversed so that relays BW and RW were first and relay BU second, then the following relays would have been operated. For the first observation, relays BW, BW1, BW1A and RW would be energized, while for the second observation relays BU, BUA and BU2 would be additionally energized.

Either observation may be dropped at any time, whereupon the remaining one if not first will be advanced to be first. The drop-out circuits operate in the same manner as previously described for the three-bearing mode except that switch DS3 is not used. Only switches DS1 and DS2 together with their associated relays and circuits are employed. In addition, $\dot{R}$ and $S_o$ are dropped with R, while $B_r$ is dropped with B.

In any mode of operation, an operator by observing the status of the memory relays BU1, BU2, BV1, BV2, BW1 and BW2 will know at any instant where any particular order of observation is stored. If desired, any other form of indicator may be energized or operated by these relays to show where particular observations are stored.

All the relays in the system are shown unenergized (contacts in normal position). All power shown off until system is turned on.

SPECIAL RELAYS CONTROLLED BY PROGRAMMER

There are in FIG. 9(*c*) four relays KTX, KTY, DX and DY whose functions will be explained later. The operating circuit 234 of relay KTX includes contacts $BW2_5$, $BW1A_5$, $BV1A_4$ and contacts $RR_7$ arranged as shown in FIG. 10(*b*). The operating circuit 235 for relay KTY includes contacts $BV2_8$, $BV1A_5$, $BU1A_4$ and contacts $TB_4$ arranged as shown. Operation of relays KTX and KTY is dependent on insertion order of the observations. In the three-bearing mode, relay KTX is operated when the $T_z$ shaft is locked before the $T_x$ shaft whereas relay KTY is operated when the $T_y$ shaft is locked before the $T_z$ shaft. In the end-point mode, relay KTX is operated when the $T_z$ shaft is locked before the $T_x$ and $T_y$ shafts whereas relay KTY is operated when the $T_x$ and $T_y$ shafts are locked before the $T_z$ shaft. In the range-rate mode, relay KTY is energized when the $T_y$ shaft is locked before the $T_z$ shaft.

When operated, relay KTY operates the arm of a reversing switch $KTY_1$ in the upward direction (FIG. 10(*a*)). Operated KTY also operates the arm of a switch $KTY_2$ downward (FIG. 10(*a*)). Relay KTX when operated, moves the arm of a switch $KTX_1$ (FIG. 10(*b*)) downward and the arms of reversing switches $KTY_2$ and $KTX_3$ upward (FIG. 10(*a*)). When relays KTY and KTX are deenergized, the switches controlled thereby are in their normal positions shown in FIGS. 10(*a*) and (*b*).

The operating circuit for relays DX and DY include the arrangement of a cam switch CS1 and the relay contacts shown at 236 (FIG. 9(*c*)). Cam switch CS1 is controlled by a cam 237 on the $B_x-B_y$ shaft 180. The normal position of this switch is that shown in the drawing and is referred to as "cam out." The opposite position referred to as "cam in" is when cam 237 operates the CS1 switch arm downward. The cam operates the CS1 switch downward when $B_x>B_y$ and *x* is before *y* (relay BU operated before relay BV), or when $B_x>B_y$ and *y* is before *x* (relay BV operated before relay BU).

In the three-bearing case relay DX operates under any one of the following conditions:

(1) Cam out and relay BU is first.
(2) Cam out and relay BV is first and relay BU is second.
(3) Cam in and relay BW is first.
(4) Cam in and relay BV is first and BW is second.

In end-point case, relay KDX is operated when relay BW is first.

In the three-bearing case relay DY is operated under any one of the following conditions:

(1) Cam in and relay BV is first.
(2) Cam in and relay BU is first and BV second.
(3) Cam out and relay BW is first.
(4) Cam out and relay BU is first and BW is second.

In the end-point and range-rate modes, relay DY is operated when relay BW is first.

Relay DX controls the reversing switches $DX_1$ and $DX_2$ (FIG. 10(*b*)). The arms of these switches are in their normal position, the downward direction of the drawing, when relay DX is deenergized, and in the upward position when the relay is energized. In similar manner, the relay $DY_1$ controls the reversing switches $DY_1$ and $DY_2$.

MECHANIZATION OF SOLUTION SECTION

All the resolvers and most of the potentiometers shown in FIG. 8, together with their operating shafts, are included in FIGS. 10(*a*) and (*b*), wherein the solution section 24 is shown in detail. They are shown connected to a source of voltage 230. All potentiometers in the case are connected to a source of voltage whether such sources are shown or not. Because the various parts of the solution sections are connected in one way or another in the mechanizations for all the solution modes, various parts of the solution sections such as resolvers, etc., and their outputs, will be described before integrating these parts into the varoius mechanizations of the solution section for the different modes.

As seen in FIG. 10(*a*), resolver 170 includes a stator input winding 240 and a rotor winding 242. A voltage proportional to $R_z$ is fed to the input winding from potentiometer 140 through contacts $RR_4$, while the rotor winding is driven by the $B_y-B_z$ shaft 166, thus to provide a voltage proportional to $R_z \sin (B_y-B_z)$ as the output of rotor winding 242. $R_z \sin (B_y-B_z)$ is a resolution of range across an observation line of sight. Voltages proportional to $Y_y-Y_z$ and $X_y-X_z$ are supplied from potentiometers 228 and 216 to respective quadrature input stator windings 244 and 246 of resolver 192, and the rotor winding 248 of this resolver is driven by the $B_y$ shaft 64 to produce as the rotor winding output a voltage representing $(X_y-X_z) \cos B_y-(Y_y-Y_z) \sin B_y$, whose terms represent X and Y components of own ship travel resolved across an observation line of sight. Resolver 182 includes an input stator winding 250 supplied with a voltage proportional to $S_t$ from the $S_t$ potentiometer 252 whose adjustable arm is controlled by the output shaft 253 of the $S_t$ servomotor 32 (FIG. 1). The rotor winding 254 of resolver 182 is driven by the $B_y-C_t$ shaft 180, and the output of this rotor winding represents $S_t$ sin $B_y-C_t$), which is target sped resolved across an observation line of sight.

A voltage proportional to $S_t$ is supplied from potentiometer 252 to a stator input winding 256 of resolver 176, which has quadrature rotor windings 258 and 260 driven by the $B_x-C_t$ shaft 172, whereby rotor winding 258 provides a voltage proportional to $S_t \sin (B_x-C_t)$ while rotor winding 260 provides a voltage proportional to $S_t \cos (B_x-C_t)$. $S_t \sin (B_y-C_t)$ is target speed resolved across line of sight, while $S_t \cos (B_x-C_t)$ is target speed resolved along a line of sight.

Resolver 190 whose rotor is driven by the $B_x$ shaft 60, includes quadrature stator input windings 262 and 264, and quadrature rotor windings 266 and 268. Input winding 262 receives a voltage proportional to $Y_z-Y_x$ from the potentiometer 222 while a voltage proportional to $X_z-X_x$ is supplied by potentiometer 210 to the input winding 264. Thus rotor winding 266 provides an output voltage proportional to $(X_z-X_x) \sin B_x+(Y_z-Y_x) \cos B_x$, and rotor winding 268 provides a voltage proportional to $(X_z-X_x) \cos B_x-(Y_z-Y_x) \sin B_x$. Resolver 164 has a rotor winding 270 driven by the $B_z-B_x$ shaft 160 and a stator input winding 272 connected to normally open contacts $TB_5$ of relay TB which contacts when closed connect input winding 272 to the $R_x/S_o$ potentiometer 148 to supply the input winding with a voltage proportional to $R_x$ or $S_o$ depending on the status of the RR relay. Thus, when relay TB is operated, the rotor winding 270 will provide a voltage proportional to $R_x \sin (B_z-B_x)$.

Resolver 188 has quadrature rotor windings 276 and 278 driven by the $B_x-B_y$ shaft 184 and an input stator winding 280 connected to a normally open contact $EP_8$ of relay EP which when closed allow potentiometer 148 to supply a voltage proportional to $R_x$ to input winding 280 when relays TB and RR are unoperated (end point mode). Input winding 280 is also connected to normally open contacts $RR_3$ of relay RR which contacts when closed allow potentiometer 140 to supply a voltage proportional to $R_z$ to input winding 280. Thus, when relay EP is operated and relays TB and RR are unoperated, rotor winding 276 provides an output voltage proportional to $R_x \cos B_x-B_y$ while the rotor winding 278 provides an output voltage proportional to $R_x \sin (B_z-B_y)$. On the other hand, with relay RR operated, the output from rotor winding 278 is proportional to $R_z \sin (B_x-B_y)$. A stator input winding 286 of resolver 124 is connected through normally closed contacts $EP_7$ of relay EP and normally closed contacts $TB_6$ of relay KTB to the $R_x/S_o$ potentiometer 148 to receive a voltage proportional to $S_o$ when the RR relay is operated, whereby the rotor winding 292 of resolver 124 which is driven by the $B_r$ shaft 50 provides an output voltage proportional to $S_o \cos B_r$.

In the three-bearing and end-point modes the mechanization of error generator 26 includes resolvers 170, 192 and 182, and a division circuit 294, while in the range rate mode, the mechanization of error generator 26 includes resolvers 192 and 182, one of the rotors of resolver 188, and the division circuit 294. The mechanization of error generator 28 for the three-bearing includes resolvers 176, 190 and 164, and a division circuit 296. For the end-point mode, the error detector 28 includes resolvers 176, 190 and 188, and the division circuit 296, while for the range rate mode, the error generator 28 includes resolvers 176 and 124.

The division circuits 294 and 296 are similar in make-up and operation. Each receives as inputs, a voltage representing a dividend and a shaft position representing a divisor, and each division circuit provides an output voltage which is proportional to the quotient of a division operation on the dividened by the divisor. The dividend input line of the division circuit 294 is at 300 and it drives the input of a summing amplifier 302 in the division circuit. The mechanical input of the circuit 294 is the $T_y-T_z$ shaft 200 which drives the arm of variable potentiometer 204. The division circuit 294 further includes a negative feedback circuit, which feed back to the amplifier input a percentage of the amplifier output proportional to the difference $T_y-T_z$. The amplifier output is alternatively connected across one or the other half of potentiometer 204, depending on the position of switch $KTY_2$ operated by relay KTY, to maintain the proper polarity of the voltage feed back to the amplifier. The output from the $T_y-T_z$ time shaft 200 will generate a voltage representing positive time if the time shafts are locked in the order $T_x$, $T_z$ and $T_y$. If the $T_y$ shaft is locked ahead of the $T_z$ shaft, $T_y$ will be smaller and $T_y-T_z$ will be negative. But negative time is meaningless. With relay KTY unoperated, the polarity of the voltage generated by the $T_y-T_z$ time shaft is proper if the time shafts are locked in the order $T_x$, $T_z$ and $T_y$. If the $T_y$ shaft is locked before the $T_z$ shaft, $T_y$ will be smaller than $T_z$, and relay KTY will be energized to shift the connections of the amplifier out put relative to the potentiometer halves to thereby maintain the proper polarity of the feedback voltage for the desired division. The feedback voltage representing the divisor must be the same for the same time differences regardless of which of $T_z$ and $T_y$ time shafts is locked first. The $T_z-T_y$ shaft rotates in one or the other direction depending on which of $T_z$ and $T_y$ shafts is locked first. The amplifier output is connected across one side of potentiometer 204 for one direction of $T_z-T_y$ shaft rotation, and across the other side of the potentiometer for opposite rotation.

Division circuit 296 likewise includes a summing amplifier 312, and a negative feedback circuit 314 controlled by the $T_z-T_x$ shaft 194 which drives the potentiometer 198 in the feedback circuit. The latter includes switch $TX_1$ of relay TX which performs the same type of function as that provided by the switch $KTY_2$ in the division circuit 294.

As hereinbefore stated, the mechanization of error generator 26 for the three-bearing and end-point modes includes resolvers 170, 192 and 182, and the division circuit 294. Specifically, the $(X_x-X_z) \cos B_y-(Y_y-Y_z) \sin B_y$ output of rotor winding 248 of resolver 192 is combined with the $R_z \sin (B_y-B_z)$ output of rotor winding 242 of resolver 170 to produce a voltage representing $R_z \sin (B_y-B_z)+(X_y-X_z) \cos B_y-(Y_y-Y_z) \sin B_y$ which is sent via normally closed contacts $RR_6$ to the division circuit 294, where it is divided by the difference $T_y-T_z$. A quotient output of division circuit 294 is on line 330, and it is combined with the $S_t \sin (B_y-C_t)$ output of rotor winding 254 of resolver 182 to provide the $E_b$ output of error generator 26 on its output line 332. The connection to rotor winding 254 is made through the reversing switch $KTY_1$, whereby the phase connection of rotor winding 254 depends on the status of relay KTY. The foregoing is a mechanization of error generator 26 according to Equation 19.

For the range-rate solution, the mechanization of error generator 26 is the same as that for the three-bearing and end-point cases, expect that by reason of operation of relay RR, resolver 188 is substituted for resolver 170, and the output $R_z \sin (B_x-B_y)$ of rotor winding 278 is added to the output of rotor winding 248, and their resultant sent to division 294 via contacts $RR_5$ and line 300. Thus, in the range rate case error generator 26 is mechanized in accordance with Equation 37.

As stated herein, the mechanization of error generator 28 for the three-bearing mode includes resolvers 176, 190 and 164, and the division circuit 296. The $$(X_z-X_x) \cos B_x-(Y_z-Y_x) \sin B_x$$

output of rotor winding 268 is combined with the $$R_x \sin (B_z-B_x)$$

output of rotor winding 270 to provide the output $$R_x \sin (B_z-B_x)+(X_x-X_x) \cos (B_x-(Y_z-Y_x) \sin B_x$$

which is sent to the division circuit via closed contacts $EP_{11}$ and line 334 to division circuit 296, where it is divided by the difference $(T_z-T_x)$. A quotient output of division circuit 296 is on line 336, and it is combined with the $S_t \sin (B_x-C_t)$ output of rotor winding 258 to provide the $E_a$ output of error generator 28 on its output line 338 through contacts $TB_8$. The connection to rotor winding 258 is through reversing switch $KTX_2$, whereby the phase connection of rotor winding 258 depends on the status of relay KTX. The foregoing is a mechanization of error generator 28 according to Equation 20.

For the end-point case, the mechanization of error generator 28 includes resolvers 176, 190 and 188, and the division circuit 296. The $$(X_z-X_x) \sin B_x+(Y_z-Y_x) \cos B_x$$

output of rotor 266 is combined with $R_z$ voltage from potentiometer 140 and the $R_x \cos (B_x-B_y)$ output of rotor winding 276 to provide the output $$(X_z-X_x) \sin B_x+(Y_z-Y_x) \cos B_x+R_z-R_x \sin (B_x-B_y)$$

which is sent to the division circuit 296 through closed contacts $EP_{12}$ and the input line 334 of the division circuit, where it is divided by the difference $T_z-T_x$. The quotient output of division circuit 296 on line 336 is combined with the $-S_t \cos (B_x-C_t)$ output of rotor winding 260 to provide the $E_a$ output of error generator 28 on its output line 338 through contacts $TB_7$. The connection to rotor winding 260 is made through closed contacts $EP_{10}$ and the reversing switch $KTX_3$, whereby the phase connection of winding 260 depends on the status of relay KTX. The foregoing is a mechanization of error generator 28 according to Equation 29.

The mechanization of error generator 28 for the range-rate case includes resolvers 176 and 124. The $S_o \cos B_r$ output of rotor winding 292 is combined with the $$-S_t \cos (B_x-C_t)$$

output of rotor winding 260 and a voltage proportioned to $\dot{R}$ from potentiometer 122 to provide the output $$S_o \cos B_r+\dot{R}-S_t \cos (B_x-C_t)$$

through contacts $TB_7$ on the output line 338 of error generator 28. The foregoing is a mechanization of error generator 28 in accordance with Equation 38.

The functions of relays KTY and KTX will be furher reviewed and further explained in a subsequent discussion in connection with their effect on error voltages sent to the error distributor and operation of relays DX and DY to compensate for some of these effects. This discussion will follow the description of the mechanization of the error distributor 30.

In considering the error distributor, the components which are interrelated to form the two error detectors 29 and 31 will be described first, after which their interconnection specific to each mode will be considered.

Resolver 351 (FIG. 10(*b*)), has a stator input winding 352 energized by the $E_b$ error voltage from error generator 26. This resolver also has quadrature rotor windings 354 and 356 set in accordance with the $B_x-C_t$ shaft 172. The output voltages of windings 354 and 356 are proportional to $E_b \cos (B_x-C_t)$ and $E_b \sin (B_x-C_t)$, respectively. Resolver 357 includes an input stator winding 358 and quadrature rotor windings, 360 and 362 set in accordance with the $B_y-C_t$ shaft 180. The error voltage $E_a$ from error generator 28 is applied to winding 358 to produce in windings 360 and 362 output voltages representing $E_a \cos (B_y-C_t)$ and $E_a \sin (B_y-C_t)$, respectively.

Reversing switches $DX_1$, $DX_2$, $DY_1$ and $DY_2$ are employed to combine the outputs of resolvers 351 and 357 as required to provide, on lines 366 and 368, the numerators of the error voltage equations in target speed and course, $dS_t$ and $dC_t$, respectively.

In the three-bearing mode (arms of switch $TB_{13}$ operated upward) the cosine windings 354 and 360 are combined in proper phase by the position of reversing switches $DY_2$ and $DX_2$ to produce on line 366 the numerator of the $dS_t$ Equation 25. For the same mode, the sine windings 356 and 362 are combined in proper phase by reversing switches $DY_1$ and $DX_1$, to produce on line 368, the numerator of the $dC_t$ Equation 26.

In the end-point and range rate modes (switch $TB_{13}$ in position shown), sine winding 356 and cosine winding 360 are combined in proper phase by the switches $DY_1$ and $DX_2$, to produce on line 366 the numerator of $dS_t$ Equations 30 and 39. For the same modes, cosine winding 354 and sine winding 362 are combined in proper phase by reversing switches $DY_2$ and $DX_1$, to produce on line 368, the numerator of the $dC_t$ Equations 31 and 40.

To complete the mechanization of the $dS_t$ error detector 31, the numerator of the $dS_t$ equation represented by the voltage on 366 must be divided by $\sin (B_x-B_y)$ in the three-bearing mode, and by $\cos (B_x-B_y)$ in the end-point and range-rate modes. This is accomplished by a division circuit 370 which includes a summing amplifier 372 and a negative feedback circuit 374. The feedback circuit includes a resolver 189 having inductively coupled stator windings 378 and 380, and quadrature rotor windings 382 and 384 positioned by the $B_x-B_y$ shaft 184. Stator winding 378 receives the $dS_t$ output of amplifier 372, and rotor winding 382 provides an output voltage proportional to $dS_t \sin (B_x-B_y)$ while rotor winding 384 produces an output voltage proportional to $dS_t$ $$\cos (B_x-B_y)$$

To perform the division by $\cos (B_x-B_y)$ in the end-point and range-rate cases, the cosine output of winding 384 is fed back to the input of amplifier 372 through contacts $TB_{10}$. The $dS_t$ output of the division circuit which is also the output of error detector 31 is obtained from winding 380 and sent along a line 386 to the $S_t$ servomotor 32. Division by $\sin (B_x-B_y)$ in the three-bearing case is performed by feeding the output of the sine winding 382 back to the input of amplifier 372 through contacts $TB_9$, and in a phase determined by the position of cam switches $CS_2$ and $CS_3$ controlled by cams 390 and 392 on the $B_x-B_y$ shaft 184. Cams 390 and 392 are arranged on shaft 184 as follows. When the difference angle $B_x-B_y$ is on one side of 0°, cam 390 operates the arms of its associated switches $CS_2$ and $CS_4$ upward, while the arms of switches $CS_3$ and $CS_5$ are operated downward by following the cam 392. On the other hand, when the difference $B_x-B_y$ is on the other side of 0°, cam 392 operates the arms of its associated switches $CS_3$ and $CS_5$ upward while the arms of switches $CS_2$ and $CS_4$ operate downward by following the cam 390. The main criterion is that the outputs from the rotor windings 382 and 404 are maintained in proper phase to provide negative feedback to amplifiers 372 and 396 in order to effect the desired mathematical division. Both cams are illustrated in the position where $B_x-B_y=0°$. Both sets of the cam switches are in the downward position.

Mechanization of the numerator of the $dC_t$ equations to provide a voltage representative thereof on line 368 has been previously described. To complete the mechanization of the $dC_t$ error detector 29, the numerator of the $dS_t$ equation on line 368 is divided by $S_t \sin (B_x-B_y)$ in the three-bearing mode, and by $S_t \cos (B_x-B_y)$ in the end-point and range-rate modes. This is accomplished by a division circuit 394, which, as division circuit 370, also includes an amplifier 396 whose output is directed into an input stator winding 398 of the resolver 187. Another stator winding 400 coupled to the winding 398 provides the output of the division circuit and of the $dC_t$ error detector 29 on a line 402 which suplies the $dC_t$ error voltage to the $C_t$ servomotor 34. Resolver 187 also includes quadrature rotor windings 404 and 406, positioned by the $(B_x-B_y)$ shaft 184. Windings 404 and 406 provide outputs proportional to $dC_t \sin (B_x-B_y)$ and $dC_t \cos (B_x-B_y)$, respectively.

To perform the division of the $dC_t$ numerator by $S_t \cos (B_x-B_y)$ in the end-point and range-rate modes, the output of the cosine winding 406, as modified by a potentiometer 408 controlled by the $S_t$ shaft 253 of motor 32, is fed back to the input of amplifier 396. The $dC_t$ output of the error detector 29 is obtained from winding 400 and passed along line 402 to the $C_t$ servomotor 34.

Division by $S_t \sin (B_x-B_y)$ in the three-bearing mode is performed by feeding the output of sine winding 404 as modified by the $S_t$ controlled potentiometer 408, back to the input of amplifier 396 through contacts $TB_{12}$, and in a phase controlled by cam switches $CS_4$ and $CS_5$.

From the preceding description of the error distributor 30, it is seen that the mechanization of error detector 31 includes a rotor winding from the $E_b$ energized resolver 351 and a rotor winding from the $E_a$ energized resolver 357. This provides an output on line 366 representing resolved components of $E_b$ and $E_a$, as found in the numerator of the $dS_t$ equation for whatever mode is under consideration. Thus numerator is divided by either $\sin (B_x-B_y)$ or $\cos (B_x-B_y)$, as the mode requires, by the division circuit 370, which completes the error detector 31.

Likewise it is seen that the mechanization of error detector 29 includes a rotor winding from each of resolvers 351 and 357, thus to provide an output on line 368 representing resolved components of $E_b$ and $E_a$ as found in the numerator of the $dC_t$ equation for whichever mode is under consideration. This numerator is divided by either $S_t \sin (B_x-B_y)$ or $S_t \cos (B_x-B_y)$, as the occasion requires, by the division circuit 394 which completes the error detector 29.

The respective $dS_t$ and $dC_t$ outputs of the error detectors on lines 386 and 402 are supplied to the $S_t$ and $C_t$ servomotors 32 and 34 through suitable amplifiers 408 and 410. These motors whose shaft outputs $S_t$ and $C_t$ are employed to supply $S_t$ and $C_t$ quantities to the error generators 26 and 28 as herein described, will continue to drive until the correct values of $C_t$ and $S_t$ are supplied to the error generators, whereupon the motors will null. The correct values of $S_t$ and $C_t$ may then be read from indicators 412 and 414 operated by the shafts 253 and 173, or sent by these shafts to other apparatus for further utilization.

It will be appreciated that to improve accuracy it is customary to employ an isolating amplifier between a resolver input winding and its energizing source, and to provide negative feedback to the amplifier from a compensating winding inductively coupled to the input winding of the resolver. While these arrangements are considered implicit in connection with each resolver in FIGS. 10(*a*) and (*b*), they are not shown in order to simplify the diagram. An example of such a circuit is illustrated in connection with resolver 182 in FIG. 11 wherein the buffer amplifier is shown at 340. Feedback is supplied to the amplifier input from a compensating winding 342 coupled to the resolver input winding 250. Such compensating windings and circuits in connection with resolvers are well-known.

Relay KTY and KTX compensate for inability of the division circuits to follow the polarity reversal of the rest of the error generator mechanizations due to insertion order. Any quantity from a resolver driven by a differential will be + or — depending on the insertion order of the information to the inputs of the differential. For example, the quantity $R_x \sin (B_z-B_x)$ could be plus or minus depending on insertion order, that is which of $B_z$ and $B_x$ shafts was locked before the other. However, the time division circuit because of its nature cannot change polarity in dependence on insertion order between say $T_z$ and $T_x$ in $(T_z-T_x)$. This inability to follow a polarity reversal, which reversal is required by the dictates of the equation involved, is compensated for by the KTX and KTY relays.

Since a reversal in polarity of the time difference due to insertion order is not recognized in the output of the division circuit, compensation is made when needed by changing the sign of another quantity in the equation. For example, in Equation 20, when insertion order causes a sign reversal in the terms of the numerator of the fraction, the value of the equation is preserved by changing the sign of the quantity $S_t \sin (B_x-C_t)$. The KTX relay does this by reversing the winding that produces $S_t \sin (B_x-C_t)$. However, this reverses the polarity of the output voltage $E_a$. Compensation for this is made, as explained later, in the error distributor relays DX and DY by reversing resolver rotor outputs where necessary. In addition, the DX and DY relays compensate for polarity reversal in the division circuits in the error distributor.

Operation and action of the KTY and KTX relays are now considered in more detail. The outputs from the $(T_z-T_x)$ and $(T_y-T_z)$ time shafts 194 and 200 will generate voltages representing positive time if the shafts are locked in the following order: $T_x$, $T_z$ and $T_y$. Negative time is meaningless. If the $T_z$ shaft is locked before the $T_x$ shaft, relay KTX is energized in the end-point and three-bearing modes only, and if the $T_y$ shaft is energized before the $T_z$ shaft, relay KTY is energized. This will allow the output shafts $(T_z-T_x)$ and $(T_y-T_z)$ to provide voltages indicative of positive time under all combinations of locking the time shafts.

In the three bearing mode of operation, relay KTY is energized by closed contacts of relay BV1A if relay BV is the first relay energized. Because relay BV locks the $T_y$ shaft, $T_y$ will be smaller than $T_z$. Therefore, relay KTY is energized to reverse the generated voltage from the $(T_y-T_z)$ shaft.

The other condition for energizing relay KTY in the three-bearing mode of operation arises when $T_y$ is locked second and $T_z$ third since $T_z$ will be greater than $T_y$. To detect this condition, the first time shaft locked will be $T_x$ and the second time shaft locked will be $T_y$ ($T_z$ must then be third). Therefore, relay KTY is energized if relays BU1A and BV2 are energized indicating the relay BU is energized first ($T_x$ locked) and relay BV is energized second ($T_y$ locked).

In the end-point mode of operation only two observations are taken. If the $T_x$ and $T_y$ shafts are locked at the first observation and the $T_z$ shaft is locked at the second observation, the KTY relay should be energized to reverse the polarity of the $(T_y-T_z)$ voltage. This is accomplished by energizing relay KTY when relay BU1A is energized. When relay BU1A is energized, relay BU has been energized first and has locked the $T_x$ and $T_y$ shafts. The pair of contacts on relay KBV2, in the path which provides energy for KTY, are short circuited by a closed pair of contacts on relay TB.

If the order of end point observations is reversed by dropping the first observation, the $T_x$ and $T_y$ shafts represent the time of the second observation and the $T_z$ shaft represents the time of the first observation. Therefore, the KTX relay must be energized to reverse the polarity of the $(T_z-T_x)$ voltage. This is accomplished by energizing relay KTX when relay BW1A is energized indicating that relay BW is energized first and locks the $T_z$ shaft in position. Relay KTY is not energized since BU1A will be deenergized.

In the range rate mode of operation relay BU is energized first and locks the $T_y$ shaft. Relay BW is energized for the second observation and locks the $T_z$ shaft. Therefore, the KTY relay is energized by the closed contacts of relay BU1A when BU is energized first and $T_y$ locked. If the first observation is dropped and another taken, the output voltage generated by the $(T_y-T_z)$ shaft will be positive since $T_z$ will represent the first observation time and $T_y$ will represent the second observation time. Therefore, relay KTY is not energized.

In addition to keeping the $(T_y-T_z)$ and $(T_z-T_x)$ quantities always representing positive time, the KTY and KTX relays also select the polarities of the outputs from resolvers 351 and 357, as will be explained later. This is necessitated by the changes that occur in the equations for $E_a$ and $E_b$ when either the *z* shafts are locked before the *x* shafts or the *y* shafts are locked before the *z* shafts.

Considering for example the $E_b$ Equation 19, in accordance with which error generator 26 is mechanized for the three-bearing and end-point modes. If the *y* shafts are locked before the *z* shafts, relay KTY is energized to keep $(T_y-T_z)$ representing positive time. However, all the terms in the numerator of the $E_b$ equation are multiplied by minus one (−1) when the *y* shaft is locked before the *z* shaft.

$$-R_z \sin (B_y-B_z)=R_z \sin (B_z-B_y)$$

$$-(Y_y-Y_z)=(Y_z-Y_z)$$

$$-(X_y-X_z)=(X_z-X_y)$$

Accordingly, relay KTY also reverses the polarity of the $S_t \sin (B_y-C_t)$ term to preserve the equation, but in doing so provides $-E_b$.

$$-E_b=\frac{-(Y_y-Y_z)\sin B_y-(X_y-X_z)\cos B_y-R_z \sin (B_y-B_z)}{T_y-T_z}-S_t \sin (B_y-C_t)$$

In a similar manenr, when the $z$ shafts are locked before the $x$ shafts, the $E_a$ voltages from error generator 28 are multiplied by minus one. Therefore, the insertion order determines whether $+E_b$ or $-E_b$, and whether $+E_a$ or $-E_a$, are sent to the error distributor 30 which develops the $dS_t$ and $dC_t$ error voltages.

$+E_a$ is used when the insertion order is such that the $x$ shafts are locked before the $z$ shafts (relay KTX deenergized), and $-E_a$ is used when the insertion order is such that the $z$ shafts are locked before the $x$ shafts (relay KTX energized).

These two expression for $dS_t$ and $dC_t$ are the correct values. They are normally obtained when the inputs to resolvers 351 and 357 are $+E_b$ and $+E_a$, respectively. Relays DX and DY are energized as previously described and as reviewed and expanded in the following paragraphs.

Relay TB is energized in the three-bearing mode of operation. As illustrated in Table VII, there are twelve situations to consider in the three-bearing mode because there are six possible orders of insertion and two possible positions for the $B_x$—$B_y$ cam 237.

*Table VII.*—CONDITIONS FOR ENERGIZING TIME SEQUENCING AND ERROR DISTRIBUTOR RELAYS IN THREE-BEARING MODE OF OPERATION

| First | Second | Third | KTX Relay | KTY Relay | Insertion Order X, Y | Geometry Direction | Cam Position | DX Relay | DY Relay |
|---|---|---|---|---|---|---|---|---|---|
| $x$ | $z$ | $y$ | ----- | ----- | $y-x$ | + | $B_x>B_y$ | ----- | ----- |
| $x$ | $z$ | $y$ | ----- | ----- | $y-x$ | − | $B_y>B_x$ | * | * |
| $x$ | $y$ | $z$ | ----- | * | $y-x$ | + | $B_x>B_y$ | ----- | * |
| $x$ | $y$ | $z$ | ----- | * | $y-x$ | − | $B_y>B_x$ | * | ----- |
| $y$ | $z$ | $x$ | * | * | $x-y$ | + | $B_y>B_x$ | ----- | ----- |
| $y$ | $z$ | $x$ | * | * | $x-y$ | − | $B_x>B_y$ | * | * |
| $y$ | $x$ | $z$ | ----- | * | $x-y$ | + | $B_y>B_x$ | * | ----- |
| $y$ | $x$ | $z$ | ----- | * | $x-y$ | − | $B_x>B_y$ | ----- | * |
| $z$ | $x$ | $y$ | * | ----- | $y-x$ | + | $B_x>B_y$ | * | ----- |
| $z$ | $x$ | $y$ | * | ----- | $y-z$ | − | $B_y>B_x$ | ----- | * |
| $z$ | $y$ | $x$ | * | ----- | $x-y$ | + | $B_y>B_x$ | ----- | * |
| $z$ | $y$ | $x$ | * | ----- | $x-y$ | − | $B_x>B_y$ | * | ----- |

*Relay energized.
+ Values of bearing increasing with time.
− Values of bearing decreasing with time.
$y-x=y$ shafts locked before $x$ shafts.
$x-y=x$ shafts locked before $y$ shafts.

$+E_b$ is used when the insertion order is such that the $z$ shafts are locked before the $y$ shafts (relay KTY deenergized), and $-E_b$ is used when the insertion order is such that the $y$ shafts are locked before the $z$ shafts (relay KTY energized).

In view of the above, the reversing switches $DX_1$, $DX_2$, $DY_1$ and $DY_2$, controlled by the error distributor relays DX and DY, are used to select the quantities shown in the numerators of the $dS_t$ and $dC_t$ error voltages.

The error distributor relays DX and DY are energized or deenergized depending upon the insertion order and the particular geometry involved. The purpose of the error distributor relays is to provide the proper polarity for the $E_b \sin (B_x-C_t)$ and $E_b \cos (B_x-C_t)$ signals from resolver 351 and the proper polarity for the $$E_a \sin (B_y-C_t)$$

and $E_a \cos (B_y-C_t)$ signals from resolver 357.

In the three-bearing mode of operation, the $E_a$ and $E_b$ error voltages are as follows:

$$E_a=\frac{-(Y_z-Y_x)\sin B_x+(X_z-X_x)\cos B_x+R_x \sin (B_z-B_x)}{T_z-T_x}+S_t \sin (B_x-C_t)$$

$$E_b=\frac{-(Y_y-Y_z)\sin B_y+(X_y-X_z)\cos B_y+R_z \sin (B_y-B_z)}{T_y-T_z}+S_t \sin (B_y-C_t)$$

The denominators of these two bracketed expressions, $T_z-T_x$ and $T_y-T_z$, are always kept representing positive time by the time sequencing relays KTX and KTY as previously explained.

Both $E_a$ and $E_b$ are functions of the error in target speed and target course. The error voltages, $dS_t$ and $dC_t$, developed from these two expressions are errors due to target speed and target course, respectively.

$$dS_t=\frac{-E_b \cos (B_x-C_t)+E_a \cos (B_y-C_t)}{\sin (B_x-B_y)}$$

$$dC_t=\frac{-E_b \sin (B_x-C_t)+E_a \sin (B_y-C_t)}{S_t \sin (B_y-B_y)}$$

Consider first the case where $B_x$ is greater than $B_y$. This can occur when the $B_x$ shaft is locked in position first and the bearing angles are decreasing with time, or when the $B_y$ shaft is locked in position first and the bearing angles are increasing with time. When $B_x$ is greater than $B_y$, the $B_x$—$B_y$ cam activates switch CS1 to the "cam in" position. With this switch in this position relay DX is energized whenever the $z$ shaft is locked first (BV1 and BU1 not energized) or the $x$ shaft is locked third (relays BU1 and BU2 not energized). Relay DY is energized whenever the $y$ shaft is locked in position first ($BV_1$ energized) or whenever the $z$ shaft is locked third (BU1 and BV2 energized).

Note that the conditions for energizing relays DX and DY correspond to the conditions which indicate that the equations for $E_a$ and $E_b$, respectively, have been multiplied by minus one.

The other condition, $B_y$ greater than $B_x$, can occur when the $B_x$ shaft is locked in position first and the bearing angles are increasing with time or when the $B_y$ shaft is locked in position first and the bearing angles are decreasing with time. When $B_y$ is greater than $B_x$ the sensitive switch is moved to the other position. Because the error voltages, $dS_t$ and $dC_t$, both contain the term $\sin (B_x-B_y)$ in the denominator, they must both be multiplied by minus one to cancel the minus one (−1) term which occurs in the denominator whenever $B_y$ is greater than $B_x$. This is necessary because $\sin (B_y-B_z) = -\sin (B_x-B_y)$. This is accomplished by the relay circuitry which is switched into operation by the $B_x$—$B_y$ cam. This circuitry dictates that relays DX and DY are normally deenergized whenever $(B_x-B_y)$ is positive, and energized when $(B_x-B_y)$ is negative. The DX and DY relays also compensate for the effect of the insertion order of the shafts upon the $(B_x-B_y)$ cam. The DX and DY circuitry, as an additional requirement, compensates for the polarity effect of the $(T_z-T_x)$ and $(T_y-T_z)$ denominator on the errors $E_a$ and $E_b$ as previously explained. The DX relay compensates for the $(T_z-T_x)$ polarity whereas the DY relay compensates for the $(T_y-T_z)$ polarity. Table VII indicates the compensation for these three criteria for ±1 correction:

(1) $(B_x-B_y)$ cam shaft polarity (2) Insertion order effect on direction of cam shaft (3) Compensation for the polarity effect on the errors $E_a$ and $E_b$ by the polarity of time division $T_y-T_z$ and $T_z-T_x$ When the value of $B_y$ is greater than the value of $B_x$, the DX relay is energized if the $y$ shaft is locked first and the $x$ shaft locked second (BV1 and BU2 energized), or if the $x$ shaft is locked first (BU1 energized). The DY relay is energized whenever the $y$ shaft is energized third (BV1 and BV2 unenergized) or whenever the $z$ shaft is energized first (BV1 and BU2 unenergized).

When the end-point or range-rate modes of operation are used the TB relay is not energized. Relays DX and DY are only energized when the $z$ shaft is locked first (BW1A energized). This provides the correct $dS_t$ and $dC_t$ voltages for the end-point and ranged-rate modes by choosing the proper outputs from resolvers 351 and 357. The switching circuitry used to energize DX and DY is considerably simpler, only two observations being involved and the error voltages, $dS_t$ and $dC_t$, have cosine functions in their denominator so that the relative values of $B_x$ and $B_y$ are not significant because $$\cos(B_x-B_y)=\cos(B_y-B_x)$$

All of the pairs of simultaneous equations for the mechanizations of error generators 26 and 28 come under the general forms of equations $$F_1(v_1, v_2)=E_1 \tag{41}$$

$$F_2(v_1, v_2)=E_2 \tag{42}$$

wherein F is symbolic of function, and wherein $v_1$ and $v_2$ are two unknown (dependent) variables for which the equations are being simultaneously solved by the solution section 24. In the case of the described target analyzer, the unknowns $v_1$ and $v_2$ are $S_t$ and $C_t$, respectively.

The total incremental error due to $v_1$ and $v_2$ in Equations 41 and 42 is $$dE_1=\frac{\partial E_1}{\partial v_1}dv_1+\frac{\partial E_1}{\partial v_2}dv_2 \tag{43}$$

$$dE_2=\frac{\partial E_2}{\partial v_1}dv_1+\frac{\partial E_2}{\partial v_2}dv_2 \tag{44}$$

and by determinants $$dv_1=\frac{dE_1\frac{\partial E_2}{\partial v_2}-dE_2\frac{\partial E_1}{\partial v_2}}{\frac{\partial E_1}{\partial v_1}\frac{\partial E_2}{\partial v_2}-\frac{\partial E_2}{\partial v_1}\frac{\partial E_1}{\partial v_2}} \tag{45}$$

$$dv_2=\frac{-dE_1\frac{\partial E_2}{\partial v_1}+dE_2\frac{\partial E_1}{\partial v_1}}{\frac{\partial E_1}{\partial v_1}\frac{\partial E_2}{\partial v_2}-\frac{\partial E_2}{\partial v_1}\frac{\partial E_1}{\partial v_2}} \tag{46}$$

The symbol "$d$" represents incremental or instantaneous value. For example, $dE_1$ is instantaneous or incremental value of $E_1$. $\partial$ is the partial derivative sign.

All the pairs of $dS_t$ and $dC_t$ equations mechanizing the error detectors 31 and 29 come under the general form Equations 45 and 46.

Thus, the error generators 26 and 28 are mechanized in accordance with Equations 41 and 42, and the error detectors 30 and 29 are mechanized in accordance with Equations 45 and 46.

While the specific example disclosed herein is directed to the solution for two unknown variables, both contained in each of two simultaneous equations, the invention may be practiced in the solution for $n$ unknown variables each contained in each of $n$ simultaneous equations. In such case there would be $n$ error generators each mechanized in accordance with a different one of the equations. Outputs from all of the error generators would be supplied as inputs to each of $n$ error detectors, whereby each error detector will provide an output due to the error of a different one of the unknown variables, there being one error detector for each of the unknown variables. The output of each error detector operates a servomotor, and the output of each servomotor is fed back to the inputs of all the error generators. When correct values of the unknown variables are fed to the error generators, the servomotors will null. The term "$n$" signifies any whole number greater than one, i.e. a plurality of two or more. In the particular example disclosed, $n=2$.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for computing target speed $S_t$ and course $C_t$ from target and own ship data taken at different times, said apparatus comprising first error generating means responsive to the receipt of signals representing known target and own ship parameters and of signals representing $S_t$ and $C_t$ values for generating an output error signal $E_a$ representing the total error due to incorrect input values of $S_t$ and $C_t$ as related to said second set of known error generating means responsive to said $S_t$ and $C_t$ signals and to signals representing a second set of known target and own ship parameters for generating an output signal $E_a$ representing the total error due to incorect input values of $S_t$ and $C_t$ and related to said second set of known parameters, means responsive to said $E_b$ and $E_a$ signals for producing separate $dS_t$ and $dC_t$ signals respectively representing the errors due to incorrect $S_t$ and $C_t$ input values supplied to both said error generating means, first and second motor means responsive respectively to said $dS_t$ and $dC_t$ signals, means responsive to said first motor means for supplying signals representing $S_t$ values to both said error generating means, and means responsive to said second motor means for supplying signals representing $C_t$ values to both said error generating means.

2. Apparatus for computing target speed $S_t$ and course $C_t$ from target and own ship data taken at different times, said apparatus comprising first error generating means responsive to the receipt of signals representing known target and own ship parameters and of signals representing $S_t$ and $C_t$ valves for generating an output error signal $E_b$ representing total error due to incorrect input valves of $S_t$ and $C_t$ as related to said known parameters, second error generating means responsive to said $S_t$ and $C_t$ signals and to signal representing a second set of known target and own ship parameters for generating an output signal $E_a$ representing the total error due to incorrect input valves of $S_t$ and $C_t$ as related to said second set of known parameters, means responsive to said $E_b$ and $E_a$ signals for producing a signal $dS_t$ representing the error due to incorrect values of $S_t$ supplied to both said error generating means, means responsive to said $E_b$ and $E_a$ signals for producing a signal $dC_t$ representing the error due to incorrect valves of $C_t$ supplied to both said error generating means, first and second motor means responsive respectively to said $dS_t$ and $dC_t$ signals, means responsive to said first motor means for supplying signals representing $S_t$ values to both said error generating means, and means responsive to said second motor means for supplying signals representing $C_t$ values to both said error generating means.

3. Apparatus for computing target speed $S_t$ and course $C_t$ in response to target and own ship data taken at discrete intervals, said apparatus comprising first error generating means responsive to input valves of $S_t$ and $C_t$ for generating an output $E_b$ representing the total error due to incorrect values of $S_t$ and $C_t$, said first generating means being mechanized according to the equation $F_1(S_t, C_t)=E_b$, a second error generating means responsive to input values of $S_t$ and $C_t$ for generating an output $E_a$ representing the total error due to incorrect values of $S_t$ and $C_t$, said second generating means being mechanized according to the equation $F_2(S_t, C_t)=E_a$, first error detecting means responsive to said $E_b$ and $E_a$ outputs for providing an output $dS_t$ representing error in the value of $S_t$ supplied to both error generating means, said first error detecting means being mechanized in accordance with the equation $$dS_t=\frac{dE_a\frac{\partial E_b}{\partial C_t}-dE_b\frac{\partial E_a}{\partial C_t}}{\frac{\partial E_a}{\partial S_t}\frac{\partial E_b}{\partial C_t}-\frac{\partial E_b}{\partial S_t}\frac{\partial E_a}{\partial C_t}}$$

second error detecting means responsive to said $E_b$ and $E_a$ outputs for providing an output $dC_t$ representing error in the value of $C_t$ supplied to both said error generating means, said second error detecting means being mechanized in accordance with the equation $$dC_t=\frac{dE_b\frac{\partial E_a}{\partial S_t}-dE_a\frac{\partial E_b}{\partial S_t}}{\frac{\partial E_a}{\partial S_t}\frac{\partial E_b}{\partial C_t}-\frac{\partial E_b}{\partial S_t}\frac{\partial E_a}{\partial C_t}}$$

first motor means responsive to said $dS_t$ output, second motor means responsive to said $dC_t$ output, means responsive to said first motor means for supplying values of $S_t$ to both said error generating means, and means responsive to said second motor means for supplying values of $C_t$ to both said generating means.

4. Apparatus for computing target speed $S_t$ and course $C_t$ in response to target and own ship data taken at discrete times, said apparatus comprising first error generating means responsive to the receipt of values of $C_t$ and $S_t$ and of a set of target and own ship data for generating an output $E_b$ representing total error due to incorrect $C_t$ and $S_t$ values as related to said set of data, second error generating means responsive to the receipt of $S_t$ and $C_t$ values and of another set of target and own ship data for generating an output $E_a$ representing total error due to incorrect $C_t$ and $S_t$ values as related to said another set of data, first error detecting means responsive to said $E_b$ and $E_a$ outputs for providing an error signal $dS_t$ representing error of the $S_t$ values applied to both said error generating means, second error detecting means responsive to said $E_a$ and $E_b$ outputs for providing an error signal $dC_t$ representing error of the $C_t$ values applied to both said error generating means, first motor means responsive to said $dS_t$ signals, means responsive to said first motor means for supplying values of $S_t$ to both said error generating means, second motor means responsive to said $dC_t$ signals, and means responsive to said second motor means for supplying values of $C_t$ to both said error generating means.

5. Apparatus for computing target speed $S_t$ and course $C_t$ in response to target and own ship data taken at discrete intervals, said apparatus comprising first error generating means responsive to the receipt of $S_t$ and $C_t$ values and to resolved quantities of $S_t$, target range and own ship travel along reference coordinate axes during an elapsed time for generating an output $E_b$ representing total error due to incorrect value of $S_t$ and $C_t$, second error generating means having three selectable mode configurations, in a first of said configurations and second error generating means being responsive to receipt of $S_t$ and $C_t$ values to resolved quantities of $S_t$ and target range and own ship travel along reference coordinate axes during another elapsed time for providing an output $E_a$, in a second of said configurations said second error generating means being responsive to target range and to resolved quantities of $S_t$ and target range and own ship travel along reference coordinate axes during said first elapsed time for supplying an output $E_a$, in the third of said configurations said second error generating means being responsive to target range rate and to resolved quantities of $S_t$ and own ship speed for providing an output $E_a$, the $E_a$ output for any one of said configurations being representative of the total error due to incorrect values of $S_t$ and $C_t$ supplied to said second error means for the configuration selected, first error detector means responsive to resolved quantities of said $E_b$ and $E_a$ outputs for providing a $dS_t$ output representing error in $S_t$ values supplied to both said error generating means, second error detecting means responsive to resolved quantities of said $E_b$ and $E_a$ outputs for providing an output $dC_t$ representing error in $C_t$ values supplied to both said error generating means, first motor means responsive to said $dS_t$ output, means responsive to said first motor means for supplying $S_t$ input values to both said error generating means, second motor means responsive to said $dC_t$ output, and means responsive to said second motor means for supplying $C_t$ input values to both said error generating means.

6. Apparatus for computing target speed $S_t$ and course $C_t$ in response to target and own ship data taken at discrete times, said apparatus comprising: first error generating means having input means for receiving signals representing values of $S_t$ and $C_t$ and a set of own ship and target data, said error generating means further including first means for resolving values of $S_t$, second means for resolving an observed target range, third means for resolving distances travelled by own ship along reference coordinate axes during a time interval, and means responsive to said first, second and third resolving means for generating an output signal $E_b$ representing total error due to incorrect values of $S_t$ and $C_t$; second error generating means having input means for receiving signals representing values of $S_t$ and $C_t$ and another set of own ship and target data, said second error generating means further including fourth means for resolving values of $S_t$, fifth means for resolving target range, sixth means for resolving distances travelled by own ship along reference coordinate axes during another time interval, and means responsive to said fourth, fifth and sixth resolving means for generating an output signal $E_b$ representing total error due to incorrect values of $S_t$ and $C_t$; first error detecting means including seventh means for resolving said $E_b$ output signal, eighth means for resolving said $E_a$ output signal, and means responsive to said seventh and eighth resolving means for producing an output signal $dS_t$ representing the error due to incorrect values of $S_t$ applied to both said error generating means; second error detecting means including ninth means for resolving said $E_b$ output signal, tenth means for resolving said $E_a$ output signal, and means responsive to said ninth and tenth resolving means for producing an output signal representing the error due to incorrect values of $C_t$ applied to both said error generating means; first motor means responsive to said $dS_t$ output, means responsive to said first motor means for supplying signals representing $S_t$ input values to both said error generating means, second motor means responsive to said $dC_t$ output, and means responsive to said second motor means for supplying $C_t$ input values to both said error generating means.

7. Apparatus for computing target speed $S_t$ and course $C_t$ in response to target and own ship data taken at discrete times, said apparatus comprising: first error generating means having input means for receiving signals representing values of $S_t$ and $C_t$ and a set of own ship and target data, said error generating means further including first means for resolving values of $S_t$, second means for resolving an observed target range, third means for resolving distances travelled by own ship along reference coordinate axes during a time interval, and means responsive to said first, second and third resolving means for generating an output signal $E_b$ representing total error due to incorrect values of $S_t$ and $C_t$; second error generating means having input means for receiving signals representing values of $S_t$ and $C_t$ and a set of own ship and target data, said error generating means further including fourth means for resolving $S_t$, fifth means for resolving another observed target range, sixth means for resolving distances travelled by own ship along reference coordinate axis, during said time interval, and means responsive to said fourth, fifth and sixth resolving means and to a signal representing the first said target range for producing an output signal $E_a$ representing total error due to incorrect values of $S_t$ and $C_t$; first error detecting means including seventh means for resolving said $E_b$ output signal, eighth means for resolving said $E_a$ output signal, and means responsive to said seventh and eighth resolving means for producing an output signal $dS_t$ representing the error due to incorrect values of $S_t$ applied to both said error generating means; second error detecting means including ninth means for resolving said $E_b$ output signal, tenth means for resolving said $E_a$ output signal, and means responsive to said ninth and tenth resolving means for producing an output signal representing the error due to incorrect values of $C_t$ applied to both said error generating means; first motor means responsive to said $dS_t$ output, means responsive to said first motor means for supplying signals representing $S_t$ input values to both said error generating means, second motor means responsive to said $dC_t$ output, and means responsive to said second motor means for supplying $C_t$ input values to both said error generating means.

8. Apparatus for computing target speed $S_t$ and course $C_t$ in response to target and own ship data taken at discrete times, said apparatus comprising: first error generating means having input means for receiving signals representing values of $S_t$ and $C_t$ and a set of own ship and target data, said error generating means further including first means for resolving values of $S_t$, second means for resolving an observed target range, third means for resolving distances travelled by own ship along reference coordinate axes during a time interval, and means responsive to said first, second and third resolving means for generating an output signal $E_b$ representing total error due to incorrect values of $S_t$ and $C_t$; second error generating means having input means for receiving signals representing values of $S_t$ and $C_t$ and another set of own ship and target data, said error generating means further including fourth means for resolving own ship speed, fifth means for resolving $S_t$, and means responsive to said fourth and fifth resolving means and a signal representing range rate for producing an output signal $E_a$ representing total error due to incorrect values of $S_t$ and $C_t$; first error detecting means including seventh means for resolving said $E_b$ output signal, eighth means for resolving said $E_a$ output signal, and means responsive to said seventh and eighth resolving means for producing an output signal $dS_t$ representing the error due to incorrect values of $S_t$ applied to both said error generating means; second error detecting means including ninth means for resolving said $E_b$ output signal, tenth means for resolving said $E_a$ output signal, and means responsive to said ninth and tenth resolving means for producing an output signal representing the error due to incorrect values of $C_t$ applied to both said error generating means; first motor means responsive to said $dS_t$ output, means responsive to said first motor means for supplying signals representing $S_t$ input values to both said error generating means, second motor means responsive to said $dC_t$ output, and means responsive to said second motor means for supply $C_t$ input values to both said error generating means.

9. Apparatus for computing target speed $S_t$ and course $C_t$ in response to target and own ship data taken at discrete intervals, said apparatus comprising first error generating means including first resolver means responsive to the receipt of $S_t$ and $C_t$ values for resolving $S_t$ and means responsive to said first resolver means and to resolved quantities of target range and own ship travel along reference coordinate axes during an elapsed time interval for generating an output $E_b$ representing total error due to incorrect values of $S_t$ and $C_t$ supplied to said first resolver means, second error generating means including second resolver means responsive to receipt of $S_t$ and $C_t$ values for resolving $S_t$ and means responsive to said second resolver and signals representing target range information and resolved quantities of own ship information for generating an output $E_a$ representing total error due to incorrect values of $S_t$ and $C_t$ supplied to said second resolver means, first error detector means responsive to resolved quantities of $E_b$ and $E_a$ for providing an output $dS_t$ representing error in $S_t$ values supplied to said first and second resolver means, second error detecting means responsive to resolved quantities of $E_b$ and $E_a$ for providing an output $dC_t$ representing error due to $C_t$ values supplied to said first and second resolver means, a first servo motor responsive to said $dS_t$ output, means responsive to the first servo motor for supply values of $S_t$ to said first and second resolver means, a second servo motor responsive to said $dC_t$ output, and means responsive to the second servo motor for supplying $C_t$ values to said first and second resolver means.

10. Apparatus for computing target speed $S_t$ and course $C_t$ in response to target and own ship data taken at discrete times, said apparatus comprising: first error generating means having inputs for receiving values of $S_t$ and $C_t$ and known own ship and target data, said first error generating means comprising first resolver means energized in accordance with $S_t$ input values and angularly set in accordance with $B_y-C_t$ representing the difference between $C_t$ and a target bearing $B_y$ observed at time $T_y$, second resolver means energized in accordance with an observed target range $R_z$ taken at time $T_z$ and angularly set in accordance with $B_y-B_z$ representing the difference between $B_y$ and another target bearing $B_z$ observed at time $T_z$, third resolver means energized in accordance with own ship travel along an X axis during the time interval $T_y-T_z$ and angularly set in accordance with bearing $B_y$, fourth resolver means energized in accordance with own ship travel along a Y axis during said time interval and angularly set in accordance with bearing $B_y$, first timing means providing an output proportional to $T_y-T_z$, and means responsive to said first, second, third and fourth resolver means and to said first timing means for generating an output $E_b$ representing total error due to incorrect input values of $S_t$ and $C_t$ supplied to said first error generating means; second error generating means having input means for receiving values of $S_t$ and $C_t$ and another set of known own ship and target data, said second error generating means comprising fifth resolver means energized in accordance with $S_t$ input values and angularly set in accordance with $B_x-C_t$ representing the difference between $C_t$ and a target bearing $B_x$ observed at time $T_x$, sixth resolver means energized in accordance with said observed target range R and angularly set in accordance with the difference $B_z-B_x$, seventh resolver means energized in accordance with own ship travel along said X axis during the time interval $T_z-T_x$ and angularly set in accordance with bearing $B_x$, eighth resolver means energized in accordance with own ship travel along said Y axis during said time interval $T_z-T_x$ and angularly set in accordance with bearing $B_x$, second timing means for providing an output proportional to $T_z-T_x$, and means responsive to said fifth, sixth, seventh and eighth resolver means and to said second timing means for generating an output $E_a$ representing total error due to incorrect input values of $S_t$ and $C_t$ supplied to said second error generating means; ninth resolver means energized in accordance with said $E_a$ output and angularly set in accordance with the difference $B_y-C_t$; tenth resolver means energized in accordance with said $E_b$ output and angularly set in accordance with the difference $B_x-C_t$; eleventh resolver means angularly set in accordance with the difference $B_x-B_y$; first error detecting means responsive to said ninth, tenth and eleventh resolver means for producing an output $dS_t$ representing the error due to $S_t$ input values supplied to both said error generating means; twelfth resolver means energized in accordance with the output on the $E_a$ terminal and angularly set in accordance with the difference $B_y-C_t$; thirteenth resolver means energized in accordance with said $E_b$ output and angularly set in accordance with the difference $B_x-C_t$; fourteenth resolver means energized in accordance with $S_t$ input values and angularly set in accordance with the difference $B_x-B_y$; second error detecting means responsive to said twelfth, thirteenth and fourteenth resolver means for producing an output $dC_t$ representing the error due to $C_t$ values supplied to both said error generating means; a first servo motor responsive to said $dS_t$ output; a second servomotor responsive to said $dC_t$ output; means responsive to said first servo motor for supplying $S_t$ input values to both said error generating means; and means responsive to said $dC_t$ output for supplying $C_t$ input values to both said error generating means.

11. Apparatus for computing target speed $S_t$ and course $C_t$ in response to target and own ship data taken at discrete times, said apparatus comprising: first error generating means having inputs for receiving values of $S_t$ and $C_t$ and known own ship and target data, said first error generating means comprising first resolver means energized in accordance with $S_t$ input values and angularly set in accordance with $B_y-C_t$ representing the difference between $C_t$ and a target bearing $B_y$ observed at time $T_y$, second resolver means energized in accordance with an observed target range $R_z$ taken at time $T_z$ and angularly set in accordance with $B_y-B_z$ representing the difference between $B_y$ and another target bearing $B_z$ observed at time $T_z$, third resolver means energized in accordance with own ship travel along an X axis during the time interval $T_y-T_z$ and angularly set in accordance with bearing $B_y$, fourth resolver means energized in accordance with own ship travel along a Y axis during said time interval and angularly set in accordance with bearing $B_y$, first timing means providing an output proportional to $T_y-T_z$, and means responsive to said first, second, third and fourth resolver means and to said first timing means for generating an output $E_b$ representing total error due to incorrect input values of $S_t$ and $C_t$ supplied to said first error generating means; second error generating means having input means for receiving values of $S_t$ and $C_t$ and another set of known own ship and target data, said second error generating means comprising fifth resolver means energized in accordance with $S_t$ input values and angularly set in accordance with the difference $B_z-C_t$, sixth resolver means energized in accordance with a target range $R_y$ taken at time $T_y$ and angularly set in accordance with the difference $B_z-B_y$, seventh resolver means energized in accordance with own ship travel along said X axis during said time interval $T_y-T_z$ and angularly set in accordance with bearing $B_z$, eighth resolver means energized in accordance with own ship travel along said Y axis during said time interval $T_y-T_z$ and angularly set in accordance with bearing $B_z$, means providing an output proportional to the target range $R_z$ taken at time $T_z$, and means responsive to said $T_y-T_z$ output and to said $R_z$ output and to said fifth, sixth, seventh and eighth resolver means for generating an output $E_a$ representing total error due to incorrect input values of $S_t$ and $C_t$ supplied to said second error generating means; ninth resolver means energized in accordance with said $E_a$ output and angularly set in accordance with the difference $B_y-C_t$; tenth resolver means energized in accordance with said $E_b$ output and angularly set in accordance with the difference $B_x-C_t$; eleventh resolver means angularly set in accordance with the difference $B_x-B_y$; first error detecting means responsive to said ninth, tenth and eleventh resolver means for producing an output $dS_t$ representing the error due to $S_t$ input values supplied to both said error generating means; twelfth resolver means energized in accordance with the output on the $E_a$ terminal and angularly set in accordance with the difference $B_y-C_t$; thirteenth resolver means energized in accordance with said $E_b$ output and angularly set in accordance with the difference $B_x-C_t$; fourteenth resolver means energized in accordance with $S_t$ input values and angularly set in accordance with the difference $B_x-B_y$; second error detecting means responsive to said twelfth, thirteenth and fourteenth resolver means for producing an output $dC_t$ representing the error due to $C_t$ values supplied to both said error generating means; a first servo motor responsive to said $dS_t$ output; a second servo motor responsive to said $dC_t$ output; means responsive to said first servo motor for supplying $S_t$ input values to both said error generating means; and means responsive to said $dC_t$ output for supplying $C_t$ input values to both said error generating means.

12. Apparatus for computing target speed $S_t$ and course $C_t$ in response to target and own ship data taken at discrete times, said apparatus comprising: first error generating means having inputs for receiving values of $S_t$ and $C_t$ and known own ship and target data, said first error generating means comprising first resolver means energized in accordance with $S_t$ input values and angularly set in accordance with $B_y-C_t$ representing the difference between $C_t$ and a target bearing $B_y$ observed at time $T_y$, second resolver means energized in accordance with an observed target range $R_z$ taken at time $T_z$ and angularly set in accordance with $B_y-B_z$ representing the difference between $B_y$ and another target bearing $B_z$ observed at time $T_z$, third resolver means energized in accordance with own ship travel along an X axis during the time interval $T_y=T_y$ and angularly set in accordance with bearing $B_y$, fourth resolver means energized in accordance with own ship travel along a Y axis during said time interval and angularly set in accordance with bearing $B_y$, first timing means providing an output proportional to $T_y-T_z$, and means responsive to said first, second, third and fourth resolver means and to said first timing means for generating an output $E_b$ representing total error due to incorrect input values of $S_t$ and $C_t$ supplied to said first error generating means; second error generating means having input means for receiving values of $S_t$ and $C_t$ and another set of known own ship and target data, said second error generating means comprising fifth resolver means energized in accordance with own ship speed and angularly set in accordance with a relative bearing $B_r$ observed at time $T_z$, means providing an output proportional to range $\dot{R}$, sixth resolver means energized in accordance with $S_t$ input values and angularly set in accordance with $B_z-C_t$, and means responsive to said $\dot{R}$ output and to said fifth and sixth resolver means for generating an output $E_a$ representing total error due to incorrect input values of $S_t$ and $C_t$ supplied to said second error generating means; seventh resolver means energized in accordance with the output from said $E_a$ terminal and angularly set in accordance with $B_y-C_t$; eighth resolver means energized in accordance with said $E_a$ output and angularly set in accordance with the difference $B_z-C_t$; ninth resolver means angularly set in accordance with the difference $B_z-B_y$; first error detecting means responsive to said seventh, eighth and ninth resolver means for producing an output $dS_t$ representing the error due to $S_t$ input values supplied to both said error generating means; tenth resolver means energized in accordance with said $E_a$ output and angularly set in accordance with $B_y-C_t$; eleventh resolver means energized in accordance with said $E_b$ output and angularly set in accordance with the difference $B_z-C_t$; twelfth resolver means energized in accordance with $S_t$ input values and angularly set in accordance with the difference $B_z-B_y$; second error detecting means responsive to said tenth, eleventh and twelfth resolver means for producing an output $dC_t$ representing the error due to $C_t$ values supplied to both said error generating means; a first servo motor responsive to said $dS_t$ output; a second servo motor responsive to said $dC_t$ output; means responsive to said first servo motor for supplying $S_t$ input values to both said error generating means; and means responsive to said $dC_t$ output for supplying $C_t$ input value to both said error generating means.

References Cited in the file of this patent

UNITED STATES PATENTS

| | | |
|---|---|---|
| 2,581,438 | Palmer | Jan. 8, 1952 |
| 2,600,159 | Ergen | June 10, 1952 |
| 2,841,333 | Agins et al. | July 1, 1958 |
| 2,911,146 | Tanneau et al. | Nov. 3, 1959 |
| 2,969,184 | Miner et al. | Jan. 24, 1961 |
| 2,977,049 | Miner et al. | Mar. 28, 1961 |
| 2,983,858 | Herndon | May 9, 1961 |